United States Patent
Tanaka et al.

(10) Patent No.: US 9,249,262 B2
(45) Date of Patent: Feb. 2, 2016

(54) CURABLE ORGANIC POLYMER AND METHOD FOR PRODUCTION THEREOF, AND CURABLE COMPOSITION CONTAINING THE SAME

(75) Inventors: Hidenori Tanaka, Settsu (JP); Katsuyu Wakabayashi, Settsu (JP)

(73) Assignee: KANEKA CORPORATION, Osaka (JP)

( * ) Notice: Subject to any disclaimer, the term of this patent is extended or adjusted under 35 U.S.C. 154(b) by 742 days.

(21) Appl. No.: 12/432,376

(22) Filed: Apr. 29, 2009

(65) Prior Publication Data

US 2009/0247712 A1  Oct. 1, 2009

Related U.S. Application Data

(63) Continuation-in-part of application No. PCT/JP2007/071094, filed on Oct. 30, 2007.

(30) Foreign Application Priority Data

Nov. 1, 2006 (JP) .................................. 2006-298101

(51) Int. Cl.
| | |
|---|---|
| C08F 8/42 | (2006.01) |
| C08G 65/336 | (2006.01) |
| C08L 33/04 | (2006.01) |
| C08L 23/26 | (2006.01) |
| C08G 65/26 | (2006.01) |
| C08G 65/337 | (2006.01) |
| C08L 71/02 | (2006.01) |

(52) U.S. Cl.
CPC ................ *C08G 65/336* (2013.01); *C08F 8/42* (2013.01); *C08G 65/2609* (2013.01); *C08G 65/2663* (2013.01); *C08G 65/337* (2013.01); *C08L 23/26* (2013.01); *C08L 33/04* (2013.01); *C08L 71/02* (2013.01)

(58) Field of Classification Search
CPC ...... C08F 8/42; C08G 65/336; C08G 65/337; C08G 65/2663; C08L 71/02; C08L 23/26; C08L 33/04
USPC ........... 525/342, 409, 330.3, 333.7, 474, 477; 528/421, 31, 38, 41, 42
See application file for complete search history.

(56) References Cited

U.S. PATENT DOCUMENTS

| | | | |
|---|---|---|---|
| 4,507,469 A | 3/1985 | Mita et al. | |
| 4,904,732 A | 2/1990 | Iwahara et al. | |
| 4,957,976 A * | 9/1990 | Takao et al. | 525/340 |
| 5,665,823 A | 9/1997 | Saxena et al. | |
| 7,115,695 B2 | 10/2006 | Okamoto et al. | |
| 7,153,923 B2 | 12/2006 | Schindler et al. | |
| 2004/0204539 A1* | 10/2004 | Schindler et al. | 524/588 |
| 2007/0265409 A1* | 11/2007 | Wakabayashi et al. | 528/28 |
| 2008/0242825 A1* | 10/2008 | Devi et al. | 528/18 |

FOREIGN PATENT DOCUMENTS

| | | |
|---|---|---|
| EP | 0 538 881 A2 | 10/1992 |
| EP | 1 035 170 A2 | 9/2000 |
| JP | 52-073998 A | 6/1977 |
| JP | 55-009669 A | 1/1980 |
| JP | 63-006041 A | 1/1988 |
| JP | 05-117519 A | 5/1993 |
| JP | 08-134203 * | 5/1996 |
| JP | 08-134203 A | 5/1996 |
| JP | 09-316350 A | 12/1997 |
| JP | 10-087726 A | 4/1998 |
| JP | 2003-206410 A | 7/2003 |
| JP | 2005-501146 A | 1/2005 |
| WO | 02/068501 A2 | 9/2002 |
| WO | WO 2006/051799 A1 * | 5/2006 |

OTHER PUBLICATIONS

Derouet et al., Macromol. Chem. Phys. 199 (1998) 1835-1842.*
Cypryk et al., Organometallics, 21 (2002) 2165-2175.*

* cited by examiner

*Primary Examiner* — Roberto Rabago
(74) *Attorney, Agent, or Firm* — Sughrue Mion, PLLC

(57) ABSTRACT

An object of the invention is to provide a curable organic polymer having superior curability, a method for producing the same, and a curable composition containing the same. An organic polymer (A) including a silicon-containing organic group represented by the general formula (1):—

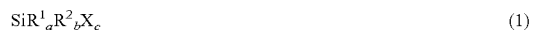

$$SiR^1_a R^2_b X_c \qquad (1)$$

(wherein, $R^1$ that is present in the number of "a" each independently represents a group including a hydrocarbon group having 1 to 20 carbon atoms as a basic skeleton, in which at least one hydrogen atom on the carbon atoms of positions 1 to 3 is substituted with an electron-withdrawing group; $R^2$ that is present in the number of "b" each independently represents a C1 to C20 hydrocarbon group, or a triorganosiloxy group represented by the formula of: $(R')_3SiO$— (wherein, R' each independently represents a hydrocarbon group having 1 to 20 carbon atoms); X that is present in the number of "c" each independently represents a hydrolyzable group or a hydroxyl group; a is 1 or 2; b is 0 or 1; c is 1 or 2; and the relationship of: a+b+c=3 is satisfied) in the number of one or more on average per molecule, a method for producing the same, and a curable composition containing the same are provided.

36 Claims, No Drawings

CURABLE ORGANIC POLYMER AND METHOD FOR PRODUCTION THEREOF, AND CURABLE COMPOSITION CONTAINING THE SAME

CROSS REFERENCE TO RELATED APPLICATIONS

This application is a Continuation-In-Part of International Application No. PCT/JP2007/071094 filed Oct. 30, 2007, claiming priority based on Japanese Patent Application No. 2006-298101 filed Nov. 1, 2006.

BACKGROUND OF THE INVENTION

1. Field of the Invention

The present invention relates to: an organic polymer including a hydrolyzable group or a hydroxyl group bound to a silicon atom, and including a silicon group which can be crosslinked by forming a siloxane bond (hereinafter, may be also referred to as "reactive silicon group"); a method for production of the same; and a curable composition containing the same.

2. Related Art

Organic polymers including at least one reactive silicon group in the molecule have been known to be characterized by availability of rubbery cured products by crosslinking via formation of a siloxane bond, which is accompanied by a hydrolysis reaction or the like of the reactive silicon group due to the moisture and the like even at room temperatures.

Among these organic polymers having a reactive silicon group, organic polymers having a main chain skeleton made of polyoxyalkylene based polymers and polyisobutylene based polymers have been already produced industrially and used broadly in applications such as sealants, adhesives, and paints (see, for example, JP-A-52-73998, and JP-A-63-6041). When the organic polymers having a reactive silicon group are used as curable compositions such as sealants, adhesives, paints and the like, a variety of characteristics such as curability and adhesiveness, mechanical characteristics, and the like are required.

The curable composition including the organic polymer having a reactive silicon group is hardened using a curing catalyst such as an organic tin compound which is commonly typified by dibutyltin bis(acetylacetonato) and which has a carbon-tin bond. In use, when curing within a short period of time is required, generally employed method includes increasing the amount of the curing catalyst, and the like. However, in recent years, toxicity of the organic tin compounds has been indicated, and thus these compounds must be carefully used in light of environmental security.

As the curing catalyst other than the organic tin compounds, inorganic tin carboxylates and other metal carboxylates, and catalyst systems in which carboxylic acid and an amine based compound are used in combination are disclosed (see, for example, JP-A-55-9669, JP-A-2003-206410, and JP-A-5-117519). However, it is possible that these catalysts are inferior in curability as compared with organic tin catalysts.

Meanwhile, it is disclosed that a curable composition which exhibits a high curing speed is obtained by using a polymer having a specified end structure (see, for example, JP-T-2005-501146 (Japanese Translation of PCT Application)).

SUMMARY OF THE INVENTION

Problems to be Solved by the Invention

An object of the present invention is to provide: an organic polymer having a reactive silicon group, which is an organic polymer that exhibits rapid curability without substantially using an organic tin catalyst; a method for production of the same; and a curable composition including the same.

Means for Solving the Problems

The present inventors elaborately investigated in order to solve the problems described above, and consequently the following invention was accomplished.

More specifically, aspects provided by the present invention are as in the following.

(I) An organic polymer (A) having a number average molecular weight of 3,000 to 100,000, and including a silicon-containing organic group represented by the general formula (1):

$$SiR^1_a R^2_b X_c \qquad (1)$$

(wherein, $R^1$ that is present in the number of "a" each independently represents a group including a hydrocarbon group having 1 to 20 carbon atoms as a basic skeleton, in which at least one hydrogen atom on the carbon atoms of positions 1 to 3 is substituted with an electron-withdrawing group; $R^2$ that is present in the number of "b" each independently represents a hydrocarbon group having 1 to 20 carbon atoms, or a triorganosiloxy group represented by the formula of: $(R')_3SiO$— (wherein, $R'$ each independently represents a hydrocarbon group having 1 to 20 carbon atoms); X that is present in the number of "c" each independently represents a hydrolyzable group or a hydroxyl group; a is 1 or 2; b is 0 or 1; c is 1 or 2; and the relationship of: a+b+c=3 is satisfied) in the number of one or more on average per molecule.

(II) The organic polymer according to paragraph (I) wherein $R^1$ in the general formula (1) is an organic group represented by the general formula (2):

$$-CR^3_{3-d} Y_d \qquad (2)$$

(wherein, Y that is present in the number of "d" each independently represents an electron-withdrawing group; $R^3$ that is present in the number of (3-d) each independently represents a hydrogen atom or an alkyl group having 1 to 19 carbon atoms; and d is any one of 1, 2 or 3).

(III) The organic polymer according to paragraph (I) or (II) wherein the electron-withdrawing group included in the organic groups represented by the general formulae (1) and (2) is at least one selected from the group consisting of a halogen atom, an alkoxy group, a substituted or unsubstituted amino group, and a trifluoromethyl group.

(IV) The organic polymer according to any one of the above paragraphs (I) to (III), wherein the electron-withdrawing group is a chlorine atom.

(V) The organic polymer according to any one of the above paragraphs (I) to (III) wherein the electron-withdrawing group is a dialkylamino group.

(VI) The organic polymer according to any one of the above paragraphs (I) to (v) wherein the main chain skeleton of the organic polymer (A) has at least one selected from the group consisting of a polyoxyalkylene based polymer, a saturated hydrocarbon based polymer, and a (meth)acrylic ester based polymer.

(VII) The organic polymer according to any one of the above paragraphs (I) to (V) wherein the main chain skeleton of the organic polymer (A) is polypropylene oxide.

(VIII) A method for producing the organic polymer (A) according to any one of the above paragraphs (I) to (VII) which includes subjecting an organic polymer (D) including an unsaturated group represented by the general formula (8):

$$—CR^9{=}CR^9{}_2 \qquad (8)$$

(wherein, $R^9$ each independently represents a hydrogen atom or a substituted or unsubstituted hydrocarbon group having 1 to 20 carbon atoms)
to a hydrosilylating reaction with a hydrosilane compound (E) represented by the general formula (9):

$$H—SiR^1{}_aR^2{}_bX_c \qquad (9)$$

(wherein, $R^1$, $R^2$, X, a, b, and c are as defined above).

(IX) A method for producing the organic polymer (A) according to any one of the above paragraphs (I) to (VII) which includes allowing an organic polymer (F) including an organic group represented by the general formula (3):

$$—SiR^2{}_eX_f(OH)_g \qquad (3)$$

(wherein, $R^2$ that is present in the number of "e" each independently represents a hydrocarbon group having 1 to 20 carbon atoms, or a triorganosiloxy group represented by the formula of: $(R')_3SiO—$ (wherein, R' each independently represents a hydrocarbon group having 1 to 20 carbon atoms); X that is present in the number of "f" each independently represents a hydrolyzable group or a hydroxyl group; e is 1 or 2; f is 0 or 1; g is 1 or 2; and the relationship of e+f+g=3 is satisfied) to condensate with an organic silicon compound (G) represented by the general formula (4):

$$(R^4O)SiR^1{}_aR^2{}_bX_c \qquad (4)$$

(wherein, $R^1$ that is present in the number of "a" each independently represents a hydrocarbon group having 1 to 20 carbon atoms in which one or more hydrogen atoms bound to any one of the carbon atoms of positions 1 to 3 are substituted with an electron-withdrawing group; $R^2$ that is present in the number of "b" each independently represents a hydrocarbon group having 1 to 20 carbon atoms, or a triorganosiloxy group represented by the formula of: $(R')_3SiO—$ (wherein, R' each independently represents a hydrocarbon group having 1 to 20 carbon atoms); $R^4$ represents a hydrocarbon group having 1 to 20 carbon atoms; X that is present in the number of "c" each independently represents a hydrolyzable group or a hydroxyl group; a is 1 or 2; b is 0 or 1; c is 1 or 2; and the relationship of a+b+c=3 is satisfied).

(X) A curable composition which includes the organic polymer (A) according to any one of the above paragraphs (I) to (VII).

(XI) The curable composition according to the above paragraph (X) which includes a curing catalyst (B) in the composition.

(XII) The curable composition according to the above paragraph (XI) wherein the curing catalyst (B) includes an amine based compound.

(XIII) The curable composition according to the above paragraph (XI) wherein the curing catalyst (B) includes a carboxylic acid.

Effects of the Invention

The organic polymer and the curable composition of the present invention exhibit rapid curability without using an organic tin catalyst.

DETAILED DESCRIPTION OF THE INVENTION

Hereinafter, the present invention will be explained in detail.

The organic polymer (A) of the present invention has one or more reactive silicon groups on average per molecule. Herein, the reactive silicon group means a group which has a hydrolyzable group bound to a silicon atom or a hydroxyl group bound to a silicon atom, and is capable of crosslinking by forming a siloxane bond via a reaction that is accelerated by a silanol condensation catalyst.

The reactive silicon group may be a group represented by the general formula (1):

$$—SiR^1{}_aR^2{}_bX_c \qquad (1)$$

(wherein, $R^1$ that is present in the number of "a" each independently represents a group including a hydrocarbon group having 1 to 20 carbon atoms as a basic skeleton, in which at least one hydrogen atom on the carbon atoms of positions 1 to 3 is substituted with an electron-withdrawing group; $R^2$ that is present in the number of "b" each independently represents a hydrocarbon group having 1 to 20 carbon atoms, or a triorganosiloxy group represented by the formula of: $(R')_3SiO—$ (wherein, R' each independently represents a hydrocarbon group having 1 to 20 carbon atoms); X that is present in the number of "c" each independently represents a hydrolyzable group or a hydroxyl group; a is 1 or 2; b is 0 or 1; c is 1 or 2; and the relationship of: a+b+c=3 is satisfied).

The reactive silicon group in the organic polymer (A) of the present invention is, as represented by the general formula (1), a silicon group having a hydrocarbon group in which at least one hydrogen atom on carbon atoms at positions 1 to 3 is substituted with an electron-withdrawing group, (hereinafter, may be also referred to as "electron-withdrawing reactive silicon group") as a substituent bound to the silicon atom, together with a hydrolyzable group or a hydroxyl group. The organic polymer (A) of the present invention exhibits rapid curability by having the electron-withdrawing reactive silicon group, as compared with organic polymers having a reactive silicon group having a nonsubstituted hydrocarbon group such as a methyl group (for example, a dimethoxymethylsilyl group or the like).

Furthermore, $R^1$ in the general formula (1) is preferably a substituent represented by the general formula (2):

$$—CR^3{}_{3-d}Y_d \qquad (2)$$

(wherein, Y that is present in the number of "d" each independently represents an electron-withdrawing group; $R^3$ that is present in the number of (3-d) each independently represents a hydrogen atom or an alkyl group having 1 to 19 carbon atoms; d is any one of 1, 2, or 3) since higher curability can be achieved. The substituent represented by the general formula (2) is a type of $R^1$ in the general formula (1), and illustrates a hydrocarbon group having an electron-withdrawing group at position 1.

Although the electron-withdrawing group (designated as Y in the general formula (2)) is not particularly limited, for example, a halogen atom or an oxygen-including substituent such as an alkoxy group or an acyloxy group, a nitrogen-including substituent such as an amino group, an alkylamino group or an ureide group, or an acyl group, an alkoxycarbonyl group, a nitro group, a cyano group, a sulfonyl group, a perfluoroalkyl group, as well as an electron-withdrawing aryl group may be exemplified.

More specific examples include: halogen atoms such as a fluorine atom, a chlorine atom, a bromine atom, and an iodine atom; alkoxy groups such as a methoxy group, an ethoxy group, a 1-propoxy group, a 2-propoxy group, a 1-butoxy group, a 2-butoxy group, a tert-butyloxy group, an octoxy group, a lauryloxy group, a phenoxy group, and a benzyloxy group; acyloxy groups such as an acetoxy group, a propanoyloxy group, and a benzoyloxy group; an amino group, and substituted amino groups such as a methylamino group, a dimethylamino group, an ethylamino group, a diethylamino group, a propylamino group, a dipropylamino group, and a diphenylamino group; groups linked by an urethane bond or an urea bond such as an ureide group and a carbamate group, acyl groups such as an acetyl group, a propanoyl group, an octanoyl group, a lauryloyl group and a benzoyl group; alkoxycarbonyl groups such as a methoxycarbonyl group, and a tert-butyloxy carbonyl group; a nitro group, a cyano group, an isocyanato group, sulfonyl groups such as a methylsulfonyl group and a toluenesulfonyl group; perfluoroalkyl groups such as a trifluoromethyl group, a pentafluoroethyl group, a perfluoropropyl group, a perfluorohexyl group and a perfluorooctyl group; electron-withdrawing aryl groups such as a difluorophenyl group, and a pentafluorophenyl group. Among these, since the resulting polymer exhibits high curability, a halogen atom, an alkoxy group, a substituted or unsubstituted amino group, and a trifluoromethyl group are preferred; a halogen atom, an alkoxy group, and a substituted or unsubstituted amino group are more preferred; and a halogen atom, and a substituted or unsubstituted amino group are still more preferred. Particularly, a chlorine atom exhibits high curability by means of a curing catalyst composed of an amine based compound. In addition, a dialkylamino group exhibits even higher curability when a curing catalyst composed of a carboxylic acid is used. When the substituent Y is a halogen atom, it is easy to exchange the halogen atom to another substituent. So a halogen atom is preferred. A chlorine atom is more preferable since the substituent Y is easily introduced. Although the number of substituent Y, "d" is any one of 1, 2 or 3, 1 is the most preferable in light of easy introduction.

Although $R^1$ in the general formula (1) is not particularly limited, for example, a fluoromethyl group, a difluoromethyl group, a trifluoromethyl group, a 3,3,3-trifluoropropyl group, a chloromethyl group, a dichloromethyl group, a 1-chloroethyl group, a 2-chloroethyl group, a 3-chloropropyl group, a 2-chloropropyl group, a bromomethyl group, an iodomethyl group, a 3-iodopropyl group, a methoxymethyl group, an ethoxymethyl group, a phenoxymethyl group, an aminomethyl group, an N-methylaminomethyl group, an N,N-dimethylaminomethyl group, an N-ethylaminomethyl group, an N,N-diethylaminomethyl group, an acetoxymethyl group, a methylcarbamate group, and a 2-cyano ethyl group may be exemplified.

X in the general formula (1) represents a hydrolyzable group or a hydroxyl group. The hydrolyzable group is not particularly limited, and known hydrolyzable groups may be exemplified. Examples of X include a hydrogen atom, a halogen atom, an alkoxy group, an aryloxy group, an acyloxy group, a ketoximate group, an amino group, an amide group, an acid amide group, an aminooxy group, a mercapto group, an alkenyloxy group, and the like. Among these, a halogen atom, an alkoxy group, an alkenyloxy group and an aryloxy group are preferred because a high activity can be achieved. In light of modest hydrolyzability and favorable handlability, an alkoxy group such as a methoxy group, or an ethoxy group is more preferred, and a methoxy group and an ethoxy group are particularly preferred. The chlorine atom is preferred since it can be easily introduced. Also, an ethoxy group and an isopropenoxy group are preferred in light of safety since the compound desorbed by the reaction is ethanol and acetone, respectively.

Moreover, an electron-withdrawing reactive silicon group preferably has two hydrolyzable groups or hydroxyl groups since rapid curability can be readily achieved.

The reactive silicon group having only one hydrolyzable group generally has a low reactivity. For example, even in an attempt to allow a polymer including a methoxydimethylsilyl group to react using an organic tin based silanol condensation catalyst, the reaction hardly proceeds, and thus increase in the molecular weight is not found. To the contrary, since the silicon group of the organic polymer (A) of the present invention is activated by the substituent Y, to allow the reaction to proceed even with only one hydrolyzable group can be expected.

Although the hydrocarbon group $R^2$ in the general formula (1) is not particularly limited, for example, an alkyl group such as a methyl group, or an ethyl group, a cycloalkyl group such as a cyclohexyl group, an aryl group such as a phenyl group, an aralkyl group such as a benzyl group and the like may be exemplified. Among these, a methyl group is particularly preferred.

Although the electron-withdrawing reactive silicon group in the general formula (1) is not particularly limited, for example, a chloromethylmethoxymethylsilyl group, a bis(chloromethyl)methoxysilyl group, a bis(chloromethyl)ethoxysilyl group, a chloromethyldimethoxysilyl group, a chloromethyldiethoxysilyl group, a dichloromethyldimethoxysilyl group, a chloroethyldimethoxysilyl group, a chloropropyldimethoxysilyl group, a 1-bromobenzyldimethoxysilyl group, a methoxymethyldimethoxysilyl group, a methoxymethyldiethoxysilyl group, an ethoxymethyldimethoxysilyl group, an aminomethyldimethoxysilyl group, a dimethylaminomethyldimethoxysilyl group, a diethylaminomethyldimethoxysilyl group, a diethylaminomethyldiethoxysilyl group, an N-(2-aminoethyl)aminomethyldimethoxysilyl group, an aminopropyldimethoxysilyl group, an N-methylaminopropyldimethoxysilyl group, an N,N-dimethylaminopropyldimethoxysilyl group, a 3-(2-aminoethyl)aminopropyldimethoxysilyl group, a 3,3,3-trifluoropropyldimethoxysilyl group, an acetoxymethyldimethoxysilyl group, an acetoxymethyldiethoxysilyl group, and the like may be exemplified. Among these, a chloromethyldimethoxysilyl group, a methoxymethyldimethoxysilyl group, a methoxymethyldiethoxysilyl group, a diethylaminomethyldiethoxysilyl group, and a 3,3,3-trifluoropropyldimethoxysilyl group are preferred since they can be readily synthesized. Also, a chloromethyldimethoxysilyl group, a chloromethyldiethoxysilyl group, a methoxymethyldimethoxysilyl group and a diethylaminomethyldiethoxysilyl group are more preferred since a cured product that exhibits a higher degree of curing, and a chloromethyldimethoxysilyl group and a diethylaminomethyldimethoxysilyl group are particularly preferred. Further, the organic polymer (A) includes the silicon group represented by the general formula (1) as an essential component; however, the silicon group represented by the general formula (7) as described later may be also included altogether.

The main chain skeleton of the organic polymer (A) is not particularly limited, and any of those having various types of main chain skeletons can be used. Specific examples include polyoxyalkylene based polymers such as polyoxyethylene, polyoxypropylene, polyoxybutylene, polyoxytetramethylene, polyoxyethylene-polyoxypropylene copolymers, and polyoxypropylene-polyoxybutylene copolymers; hydrocarbon based polymers such as ethylene-propylene based copolymers, polyisobutylene, copolymers of isobutylene with isoprene and the like, polychloroprene, polyisoprene, copolymers of isoprene or butadiene with acrylonitrile and/or styrene, polybutadiene, copolymers of isoprene or butadiene with acrylonitrile and styrene and the like, and hydrogenated polyolefin based polymers obtained by hydrogenation of these polyolefin based polymer; polyester based polymers obtained by condensation of dibasic acid such as adipic acid with glycol, or by ring opening polymerization of lactones; (meth)acrylic ester based polymers obtained by radical polymerization of a monomer such as ethyl (meth)acrylate, butyl (meth)acrylate or the like; vinyl based polymers obtained by radical polymerization of a monomer such as a (meth)acrylic ester based monomer, vinyl acetate, acrylonitrile, or styrene or the like; graft polymers obtained by polymerization of a vinyl monomer in the aforementioned polymer; polysulfide based polymers; polyamide based polymers such as polyamide 6 produced by ring opening polymerization of e-caprolactam, polyamide 6·6 produced by condensation polymerization of hexamethylenediamine and adipic acid, polyamide 6·10 produced by condensation polymerization of hexamethylenediamine and sebacic acid, polyamide 11 produced by condensation polymerization of e-aminoundecanoic acid, polyamide 12 produced by ring opening polymerization of e-aminolaurolactam, and copolymerized polyamide having 2 or more components among the polyamide described above; polycarbonate based polymers produced by condensation polymerization of, for example, bisphenol A and carbonyl chloride, organic polymers such as diallyl phthalate based polymers. Among these, saturated hydrocarbon based polymers such as polyisobutylene, hydrogenated polyisoprene, and hydrogenated polybutadiene, polyoxyalkylene based polymers, (meth)acrylic ester based polymers are preferred since the glass transition temperature is comparatively low, and the resulting cured product is excellent in cold resistance. In the description herein, for example, (meth)acrylate represents acrylate and/or methacrylate.

Although the glass transition temperature of the organic polymer (A) is not particularly limited, it is preferably no higher than 20° C., more preferably no higher than 0° C., and particularly preferably no higher than −20° C.

When the glass transition temperature is beyond 20° C., the viscosity may be increased during winter season or in cold region, thereby being capable of leading to difficulties in handling, and the flexibility of the cured product may be reduced, which may be accompanied by decrease in elongation. The glass transition temperature can be determined by DSC measurement in accordance with a measuring method as defined by JISK7121. The organic polymer such as saturated hydrocarbon based polymers, polyoxyalkylene based polymers and (meth)acrylic ester based polymers are preferred since staining generated by transfer of low molecular weight components to the adherend material is less likely to occur when used as a base polymer of adhesives and sealants.

Moreover, the polyoxyalkylene based polymer and the (meth)acrylic ester based polymer are preferred since they have high moisture permeability, are superior curability in deep section when used in one-part type compositions, and also superior in adhesiveness. Further, polyoxyalkylene based polymers are particularly preferred.

The method for introducing the reactive silicon group is not particularly limited, and any of known methods can be used. For example, the following methods may be exemplified.

(1) A polymer having a functional group such as a hydroxyl group in the molecule is allowed to react with an organic compound, which has an active group reactive to this functional group, and unsaturated group, to obtain a polymer having an unsaturated group. Alternatively, copolymerization with an epoxy compound having an unsaturated group yields a polymer having an unsaturated group. Subsequently, hydrosilane having an electron-withdrawing reactive silicon group is allowed to act on the resulting reaction product to carry out hydrosilylation. This method is, in other words, a method in which an organic polymer (D) including an unsaturated group represented by the general formula (8):

$$—CR^9{=}CR^9{}_2 \qquad (8)$$

(wherein, $R^9$ each independently represents a hydrogen atom or a substituted or unsubstituted hydrocarbon group having 1 to 20 carbon atoms) is subjected to a hydrosilylating reaction with a hydrosilane compound (E) represented by the general formula (9):

$$H—SiR^1{}_aR^2{}_bX_c \qquad (9)$$

(wherein, $R^1$, $R^2$, X, a, b, and c are as defined above).

(2) A polymer having an unsaturated group obtained in a similar manner to the method (1) is allowed to react with a compound having a mercapto group and an electron-withdrawing reactive silicon group.

(3) A polymer having a functional group such as a hydroxyl group, an epoxy group or an isocyanate group in the molecule is allowed to react with a compound having a functional group reactive to these functional groups, and an electron-withdrawing reactive silicon group.

Among the aforementioned methods, the method (1) is preferred in light of simple reaction, and low likelihood of occurrence of the side reaction. In addition, since a high conversion rate can be attained within a comparatively short reaction time, the method (3) is preferred.

Specific examples of the hydrosilane compound (E) used in the method (1) include e.g., chloromethyldichlorosilane, dichloromethyldichlorosilane, bis(chloromethyl)chlorosilane, chloromethyldiisopropenoxysilane, chloromethyldimethoxysilane, chloromethyldiethoxysilane, chloromethylmethoxymethylsilane, bis(chloromethyl)methoxysilane, methoxymethyldimethoxysilane, ethoxymethyldiethoxysilane, 3,3,3-trifluoropropyldimethoxysilane, N,N-diethylaminomethyldiethoxysilane, chloromethyldimethoxysilyloxydimethylsilane, chloromethyldiethoxysilyloxydimethylsilane, methoxymethyldimethoxysilyloxydimethylsilane, diethylaminomethyldimethoxysilyloxydimethylsilane, 3,3,3-trifluoropropyldimethoxysilyloxydimethylsilane, and the like. Of these, chloromethyldichlorosilane, chloromethyldimethoxysilane, and chloromethyldiethoxysilane are more preferred in light of the availability, and chloromethyldichlorosilane is particularly preferred. Because a side reaction is less likely to occur during the reaction, alkoxysilanes such as chloromethyldimethoxysilane, chloromethyldiethoxysilane and methoxymethyldimethoxysilane are more preferred, and chloromethyldimethoxysilane is particularly preferred.

Among the hydrosilane compounds (E) used in the method (1), hydrosilane (E1) represented by the general formula (10):

$$H—Si(CH_2Z)Z_2 \qquad (10)$$

(wherein, Z represents a halogen atom) can be particularly easily obtained. Specific examples include chloromethyldichlorosilane, bromomethyldibromosilane, and the like. Although the method for producing such hydrosilane is not particularly limited, it can be obtained by a reaction of diazomethane with trihalosilane represented by the general formula (11):

$$H—SiZ_3 \qquad (11)$$

(wherein, Z is as defined above) as described in INORGANIC SYNTHESES Vol. 6, (1960), pp. 37-41. The method for production using this reaction is preferred due to low cost of the raw material such as, for example, trichlorosilane, less likelihood of occurrence of the side reaction, and possibility of obtaining a highly pure compound intended. However, enough attention is required for use of diazomethane.

Additionally, silane compounds (H) represented by the general formula (12):

$$(CR^3_{3-d}Y_d)SiZ_3 \qquad (12)$$

(wherein, $R^3$, Y, Z, d are as defined above) are also comparatively readily available. A typical example of the compound (H) is chloromethyltrichlorosilane. By partially reducing this silane compound, a silane compound (E2) represented by the general formula (13):

$$H-Si(CR^3_{3-d}Y_d)Z_2 \qquad (13)$$

(wherein, $R^3$, Y, Z, d are as defined above) may be obtained.

Although the method for partially reducing the silane compound (H) is not particularly limited, a method in which the silane compound (H) is allowed to react with a hydrosilane compound (I) may be exemplified. This reaction is also referred to as a redistribution reaction or a proportionation reaction.

Specifically, illustrative examples of the silane compound (H) used in this method include chloromethyltrichlorosilane (Si(CH$_2$Cl)Cl$_3$), dichloromethyltrichlorosilane (Si(CHCl$_2$)Cl$_3$), trichloromethyltrichlorosilane (Si(CCl$_3$)Cl$_3$), chloromethylmethyldichlorosilane (Si(CH$_2$Cl)(CH$_3$)Cl$_2$), bis(chloromethyl)dichlorosilane (Si(CHCl$_2$)$_2$Cl$_2$), 1-chloroethyltrichlorosilane (Si(CH$_2$ClCH$_3$)Cl$_3$), fluoromethyltrifluorosilane (Si(CH$_2$F)F$_3$), bromomethyltribromosilane (Si(CH$_2$Br)Br$_3$), iodomethyltriiodosilane (Si(CH$_2$I)I$_3$), 1-bromobenzyltribromosilane (Si(CHBrC$_6$H$_5$)Br$_3$), methoxymethyltrichlorosilane, ethoxymethyltrichlorosilane, N,N-diethylaminomethyltrichlorosilane, piperidinomethyltrichlorosilane, mercaptomethyltrichlorosilane), and the like, but not limited thereto. In light of the availability, chloromethyltrichlorosilane, dichloromethyltrichlorosilane, chloromethylmethyldichlorosilane, 1-chloroethyltrichlorosilane, and bromomethyltribromosilane are more preferred, and chloromethyltrichlorosilane is particularly preferred.

The hydrosilane compound (I) is not particularly limited, and any of a variety of Si—H-containing compounds can be used. Specific examples include organomonohydrosilane such as diethylmethylsilane, triethylsilane, phenyldimethylsilane, tripropylsilane, diphenylmethylsilane, triphenylsilane, and trihexylsilane; organodihydrosilane such as phenylmethylsilane, diphenylsilane, 1,1,3,3-tetramethyldisiloxane, and 1,1,3,3-tetramethyldisilazane; organotrihydrosilane such as phenylsilane, and octylsilane; hydrolyzable group-containing hydrosilane such as methyldichlorosilane, chlorodimethylsilane, ethoxydimethylsilane, dimethoxymethylsilane, triethoxysilane, and triisopropenoxysilane, 1,3,5,7-tetramethylcyclotetrasiloxane (D4H), 1,3,5,7,9-decamethylcyclopentasiloxane (D5H), polymethylhydrogen siloxane (H oil), and the like. Among these, in light of controllability of the reaction, monohydrosilane compound having only one hydro group on the silicon atom such as aforementioned triorganosilane, methyldichlorosilane, chlorodimethylsilane, and D4H are preferred, triorganosilane is more preferred, and triethylsilane and phenyldimethylsilane are particularly preferred. In light of high reactivity, arylsilane having an aromatic ring and hydrogen siloxane are more preferred. In light of the availability, methyldichlorosilane, phenyldimethylsilane, D4H, and H oil are preferred, and methyldichlorosilane is particularly preferred.

In the reaction of the silane compound (H) with the hydrosilane compound (I) according to the present invention, a catalyst is used. Specifically, illustrative examples of the catalyst for this reaction include quaternary ammonium salts such as tetrabutylammonium fluoride, tetrabutylammonium chloride, tetrabutylammonium bromide, tetrabutylammonium iodide, hexadecyloctadecyldimethylammonium chloride, 4-hexenyldiphenylmethylammonium chloride, and methyltributylammonium chloride; quaternary phosphonium salts such as tetrabutylphosphonium chloride, tetrabutylphosphonium bromide, and benzyldecyldimethylphosphonium chloride; tertiary amines such as tripropylamine, triisopropylamine, tributylamine, octyldimethylamine, and triphenylamine; ion exchange resins such as Amberlyst™ A21 (weakly basic anion exchange resin, manufactured by Rohm and Haas Company); carriers to which a tertiary amino group or a quaternary ammonium group is covalently bound as disclosed in JP-A-6-9656; boron trifluoride, boron trichloride, aluminum trichloride, zirconium tetrachloride, KAlCl$_4$, CuCl, H$_3$BO$_3$, tris(dimethylamino)phosphineoxide, and the like, but not particularly limited thereto. Among these, in light of favorable catalyst activity and ease in handling, the quaternary ammonium salts, and the quaternary phosphonium salts are more preferred, and tetrabutylammonium chloride is particularly preferred. In light of favorable activity, ease in handling and superior availability, methyltributylammonium chloride is preferred. Since the catalyst component can be readily removed, solid catalysts such as ion exchange resins are preferred, and Amberlyst™ A21 is more preferred due to favorable activity and superior availability.

When the organic polymer (A) in which X in the general formula (1) is an alkoxy group is to be produced, the method (1) may be employed using, for example, chloromethyldimethoxysilane, but more readily available chloromethyldichlorosilane may be also used. More specifically, the organic polymer (D) including an unsaturated group is allowed to react with chloromethyldichlorosilane to obtain a chloromethyldichlorosilyl group-containing organic polymer, which is thereafter subjected to a reaction of converting into a methoxy compound, whereby a chloromethyldimethoxysilyl group-containing polymer can be obtained. Conditions for the reaction to covert into an alkoxy compound are not particularly limited, and examples of the method include e.g., (i) a method which includes adding an alcohol, and removing the produced hydrogen chloride by devolatilization to allow the reaction to proceed; (ii) a method which includes capturing hydrogen chloride with an amine based compound; (iii) a method in which hydrogen chloride is captured with a neutral compound such as trialkyl orthocarboxylate, trialkyl phosphate, or an epoxy compound; (iv) a method in which a reaction with an alkoxymetal compound is allowed, and the like. Of these, the method (iii) is preferred since the reaction proceeds in a short time with high efficiency, while being accompanied by less occurrence of side reactions, and the method in which trialkyl orthocarboxylate is used is more preferred. Trialkyl orthocarboxylate may be selected appropriately depending on the alkoxy group to be introduced. In the case of converting into the methoxy compound, trimethyl orthoformate or trimethyl orthoacetate may be used, while triethyl orthoformate or the like may be used when an ethoxy compound is to be provided. Also, the temperature condition in the reaction to convert into the alkoxy compound is not particularly limited, to allow for the reaction under a heating condition is preferred for the purpose of improving the reactivity and lowering the viscosity of the reaction system. The reaction is allowed at a temperature falling within the range of more preferably 30° C. to 100° C., and particularly preferably 50° C. to 80° C. Additionally, too long reaction time exceeding a necessary period is disadvantageous in terms of promotion of efficiency of the production step. Thus, the reaction is completed preferably within 2 hrs, and more preferably within 1 hour. Moreover, the presence of moisture in the reaction system is not preferred since the halogen substituent on the silicon is easily hydrolyzed. Therefore, the reaction system is preferably under a dry condition, and more preferably in a dry nitrogen atmosphere.

The substituent $R^9$ in the general formula (8) may be a hydrogen atom, a methyl group, an ethyl group, a phenyl group or the like, but is not particularly limited thereto. Due to less significant effect of steric hindrance on the activity of the reactive silicon group, $R^9$ is preferably a hydrogen atom.

The hydrosilylating reaction in the method (1) is accelerated by a variety of catalysts. As the hydrosilylation catalyst, a known catalyst such as any of various complexes of platinum, palladium, rhodium, ruthenium or the like may be used. In light of the reaction efficiency, a platinum catalyst such as platinic chloride, a platinum/vinylsiloxane complex or the like is preferably used. Moreover, the temperature condition in the silylation reaction is not particularly limited, but to allow for the reaction under a heating condition is preferred for the purpose of improving the reactivity and lowering the viscosity of the reaction system. The reaction is allowed at a temperature falling within the range of more preferably 50° C. to 150° C., and particularly preferably 70° C. to 120° C. Too long reaction time exceeding a necessary period may result in deterioration of the polymer main chain, and thus to regulate the reaction time depending on the temperature is preferred. Further, any type of antidegradant may be also added as needed. Although the temperature, and the reaction time are affected by the main chain structure of the organic polymer (A) to be produced, the reaction is completed preferably within 5 hrs, and more preferably within 3 hrs in light of promotion of efficiency of the production step.

Additionally, a method in which an organic polymer having silanol at the end is used as the polymer having a hydroxyl group in the molecule in the method (3) can be also employed. More specifically, a method which includes allowing an organic polymer (F) including an organic group represented by the general formula (3):

$$—SiR^2_eX_f(OH)_g \qquad (3)$$

(wherein, $R^2$ that is present in the number of "e" each independently represents a hydrocarbon group having 1 to 20 carbon atoms, or a triorganosiloxy group represented by the formula of: $(R')_3SiO—$ (wherein, R' each independently represents a hydrocarbon group having 1 to 20 carbon atoms); X that is present in the number of "f" each independently represents a hydrolyzable group or a hydroxyl group; e is 1 or 2; f is 0 or 1; g is 1 or 2; and the relationship of e+f+g=3 is satisfied) to react with an organic silicon compound (G) represented by the general formula (4):

$$(R^4O)SiR^1_aR^2_bX_c \qquad (4)$$

(wherein, $R^1$ that is present in the number of "a" each independently represents a group including a hydrocarbon group having 1 to 20 carbon atoms as a basic skeleton in which at least one hydrogen atom on the carbon atoms of positions 1 to 3 is substituted with an electron-withdrawing group; $R^2$ that is present in the number of "b" each independently represents a hydrocarbon group having 1 to 20 carbon atoms, or a triorganosiloxy group represented by the formula of: $(R')_3SiO—$ (wherein, R' each independently represents a hydrocarbon group having 1 to 20 carbon atoms); $R^4$ represents a hydrocarbon group having 1 to 20 carbon atoms; X that is present in the number of "c" each independently represents a hydrolyzable group or a hydroxyl group; a is 1 or 2; b is 0 or 1; c is 1 or 2; and the relationship of a+b+c=3 is satisfied) may be employed. This method is referred to as a method (4) herein.

In the method (4), the electron-withdrawing reactive silicon group is introduced by dealcoholizing condensation of silanol present at the end of the organic polymer (F) represented by the general formula (3) with alkoxysilane (G) represented by the general formula (4) to form a siloxane bond. The reaction conditions are not particularly limited, and an organic polymer (A) can be obtained efficiently by using a silanol condensation catalyst. Moreover, the silanol at the end may be either silanediol or silanetriol, but the end of the organic polymer (F) used in the method (4) is preferably a monofunctional silanol (represented by the general formula (3) in which X is other than a hydroxyl group) since silanediol and silanetriol have high reactivity themselves, and the reaction likely to proceed among the polymers by a self-condensation reaction. In addition, it is preferred that moisture be eliminated as much as possible since the moisture included in a significant quantity may result in complicated products through condensation reactions which can proceed among the alkoxysilane.

A method for producing an organic polymer (F) having silanol at the end represented by the general formula (3) is not particularly limited, and a method disclosed in JP-A-10-87726 and the like can be used.

$R^4$ in the general formula (4) is not particularly limited, and for example, alkyl groups such as a methyl group and an ethyl group, cycloalkyl groups such as a cyclohexyl group, aryl groups such as a phenyl group, aralkyl groups such as a benzyl group, and the like may be exemplified. Among these, a methyl group is preferred.

The silicon compound (G) represented the general formula (4) is not particularly limited, and for example, chloromethyltrimethoxysilane, chloromethyltriethoxysilane, bis(chloromethyl)dimethoxysilane, dichloromethyltrimethoxysilane, 1-chloroethyltrimethoxysilane, 2-chloroethyltrimethoxysilane, chloropropyltrimethoxysilane, methoxymethyltrimethoxysilane, methoxymethyltriethoxysilane, ethoxymethyltrimethoxysilane, aminomethyltrimethoxysilane, N,N-dimethylaminomethyltrimethoxysilane, N,N-diethylaminomethyltrimethoxysilane, N,N-diethylaminomethyltriethoxysilane, N-(2-aminoethyl)aminomethyltrimethoxysilane, aminopropyltrimethoxysilane, N-methylaminopropyltrimethoxysilane, N,N-dimethylaminopropyltrimethoxysilane, 3-(2-aminoethyl)aminopropyltrimethoxysilane, 3,3,3-trifluoropropyltrimethoxysilane, acetoxymethyltrimethoxysilane, acetoxymethyltriethoxysilane may be exemplified. Among these, chloromethyltrimethoxysilane, methoxymethyltrimethoxysilane, methoxymethyltriethoxysilane, diethylaminomethyltriethoxysilane, 3,3,3-trifluoropropyltrimethoxysilane are preferred since it is readily available and can be easily synthesized. Still further, chloromethyltrimethoxysilane, methoxymethyltrimethoxysilane and diethylaminomethyltriethoxysilane are more preferred since a polymer that exhibits higher curability can be obtained, and chloromethyltrimethoxysilane and diethylaminomethyltrimethoxysilane are particularly preferred.

The silanol condensation catalyst used in the reaction of the method (4) is not particularly limited, any of known catalysts can be used. Of these, the amine based compounds are preferred since the reaction among silanol groups or among silicon compounds can be suppressed, and selective reaction of the terminal silanol group of the organic polymer with the silicon compound is enabled. Examples of the amine based compound include laurylamine, triethylamine, N,N-dimethylaniline, 1,8-diazabicyclo(5,4,0)undecene-7 (DBU), and the like.

When it is difficult to obtain the hydrosilane used in the method (1), or when the efficiency of the hydrosilylation reaction is reduced owing to the substituent such as the amino group, the method (4) may be advantageously employed.

The organic polymer (A) may be straight or branched, and its number average molecular weight is 3,000 to 100,000, more preferably 3,000 to 50,000, and particularly preferably 3,000 to 30,000 in terms of the polystyrene equivalent measured with GPC. When the number average molecular weight is less than 3,000, the cured product is likely to be disadvantageous with respect to the elongation characteristics, while the number average molecular weight of beyond 100,000 is likely to be disadvantageous with respect to the workability due to high viscosity.

The polyoxyalkylene based polymers described above are polymers having a recurring unit represented essentially by the general formula (5):

(wherein, $R^5$ represents a straight or branched alkylene group having 1 to 14 carbon atoms), and $R^5$ in the general formula (5) is preferably a straight or branched alkylene group having 1 to 14 carbon atoms, and more preferably a straight or branched alkylene group having 2 to 4 carbon atoms. The recurring unit represented by the general formula (5) is not particularly limited, and examples thereof include

[chemical formula 1]

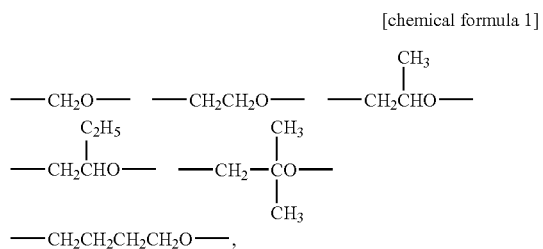

and the like. The main chain skeleton of the polyoxyalkylene based polymer may be constituted with either only one kind of the recurring unit, or two or more kinds of the recurring units. In particular, when used as a sealant and the like, it preferably consists of a polymer including a propylene oxide polymer as a principal component, since it is amorphous and has comparably low viscosity.

The synthesis method of the polyoxyalkylene based polymer is not particularly limited, and for example: polymerization with an alkaline catalyst such as KOH; polymerization with a transition metal compound-porphyrin complex catalyst such as a complex obtained by allowing an organic aluminum compound to react with porphyrin disclosed in JP-A-61-215623; polymerization with a conjugated metal cyanide complex catalyst disclosed in each publication of JP-B-46-27250, JP-B-59-15336, U.S. Pat. No. 3,278,457, U.S. Pat. No. 3,278,458, U.S. Pat. No. 3,278,459, U.S. Pat. No. 3,427,256, U.S. Pat. No. 3,427,334, U.S. Pat. No. 3,427,335 and the like; polymerization with a catalyst constituted with a polyphosphazene salt disclosed in JP-A-10-273512; polymerization by using a catalyst constituted with a phosphazene compound disclosed in Publication of JP-A-11-060722, and the like may be exemplified, The saturated hydrocarbon based polymer is a polymer not substantially including a carbon-carbon unsaturated bond other than an aromatic ring, and the polymer having such a skeleton can be obtained by (1) a method in which an olefin based compound having 2 to 6 carbon atoms such as ethylene, propylene, 1-butene or isobutylene is polymerized as a main monomer, (2) a method including homopolymerizing a diene based compound such as butadiene or isoprene, or copolymerizing the diene based compound, and thereafter allowing for hydrogenation, or the like. Of these, isobutylene based polymers and hydrogenated polybutadiene based polymers are preferred since a functional group can be readily introduced at the end, the molecular weight can be readily controlled, and the number of the terminal functional groups can be increased. Furthermore, isobutylene based polymers are more preferred.

Those in which the main chain skeleton is a saturated hydrocarbon based polymer are characterized by superior heat resistance, weather resistance, durability, and, moisture barrier properties.

In the isobutylene based polymer, all recurring units may be formed with an isobutylene unit, or a copolymer with other recurring units (monomer) is also acceptable. However, in light of the rubber characteristics, those including a recurring unit derived from isobutylene at the content of no less than 50% by weight are preferred, those including a recurring unit derived from isobutylene at the content of no less than 80% by weight are more preferred, and those including a recurring unit derived from isobutylene at the content of 90 to 99% by weight are particularly preferred.

The synthesis method of the saturated hydrocarbon based polymer is not particularly limited, and conventionally proposed various types of polymerization processes are exemplified. Living polymerization processes which have been frequently reported particularly in recent years are preferred. Of these, in the case of the saturated hydrocarbon based polymers, particularly in the case of isobutylene based polymers, inifer polymerization found by Kennedy et al., (J. P. Kennedy et al., J. Polymer Sci., Polymer Chem. Ed., 1997, Vol. 15, p. 2843) may be used, whereby the polymer can be readily produced. Accordingly, it is known that the polymerization is enabled to give the polymers having a molecular weight of approximately 500 to 100,000, with a molecular weight distribution of no greater than 1.5, and various types of functional groups can be introduced at the end of the molecules.

The (meth)acrylic ester based monomer that constitutes the (meth)acrylic ester based polymer main chain is not particularly limited, and any one of known ones can be used which include, for example, (meth)acrylic ester based monomers such as (meth)acrylic acid, methyl (meth)acrylate, ethyl (meth)acrylate, n-propyl (meth)acrylate, isopropyl (meth) acrylate, n-butyl (meth)acrylate, isobutyl (meth)acrylate, tert-butyl (meth)acrylate, n-pentyl (meth)acrylate, n-hexyl (meth)acrylate, cyclohexyl (meth)acrylate, n-heptyl (meth) acrylate, n-octyl (meth)acrylate, 2-ethylhexyl (meth)acrylate, nonyl (meth)acrylate, decyl (meth)acrylate, dodecyl (meth)acrylate, phenyl (meth)acrylate, toluoyl (meth)acrylate, benzyl (meth)acrylate, 2-methoxyethyl (meth)acrylate, 3-methoxybutyl (meth)acrylate, 2-hydroxyethyl (meth)acrylate, 2-hydroxypropyl (meth)acrylate, stearyl (meth)acrylate, glycidyl (meth)acrylate, γ-(methacryloyloxypropyl)trimethoxysilane, γ-(methacryloyloxypropyl)dimethoxymethylsilane, ethylene oxide adducts of (meth)acrylic acid, trifluoromethylmethyl (meth)acrylate, 2-trifluoromethylethyl (meth)acrylate, 2-perfluoroethylethyl (meth)acrylate, 2-perfluoroethyl-2-perfluorobutylethyl (meth)acrylate, perfluoroethyl (meth)acrylate, trifluoromethyl (meth)acrylate, bis(trifluoromethylmethyl) (meth)acrylate, 2-trifluoromethyl-2-perfluoroethylethyl (meth)acrylate, 2-perfluorohexylethyl (meth)acrylate, 2-perfluorodecylethyl (meth)acrylate, 2-perfluorohexadecylethyl (meth)acrylate, and the like. These may be used alone, or multiple monomers can be used by copolymerization.

As the aforementioned (meth)acrylic ester based polymer, a polymer obtained by copolymerization of the (meth)acrylic ester based monomer with a vinyl based monomer that is copolymerizable therewith can be also used. The vinyl based monomer is not particularly limited, and examples include styrene based monomers such as styrene, vinyltoluene, a-methylstyrene, chlorstyrene and styrenesulfonic acid, and salts thereof; fluorine-containing vinyl based monomers such as perfluoroethylene, perfluoropropylene, and vinylidene fluoride; silicon-containing vinyl based monomers such as vinyltrimethoxysilane, and vinyltriethoxysilane; maleic anhydride, maleic acid, and monoalkyl esters and dialkyl esters of maleic acid; fumaric acid, and monoalkyl esters and dialkyl esters of fumaric acid; maleimide based monomers such as maleimide, methylmaleimide, ethylmaleimide, propylmaleimide, butylmaleimide, hexylmaleimide, octylmaleimide, dodecylmaleimide, stearylmaleimide, phenylmaleimide and cyclohexylmaleimide; nitrile group-containing vinyl based monomers such as acrylonitrile and methacrylonitrile; amide group-containing vinyl based monomers such as acrylamide and methacrylamide; vinyl ester based monomers such as vinyl acetate, vinyl propionate, vinyl pivalate, vinyl benzoate and vinyl cinnamate; alkenyl based monomer such as ethylene and propylene; conjugated diene based monomer such as butadiene and isoprene; vinyl chloride, vinylidene chloride, allyl chloride, allyl alcohol, and the like. Multiple types of these can be also used as copolymerization components.

Among the (meth)acrylic ester based polymers obtained from the monomers described above, copolymers constituted with a styrene based monomer and a (meth)acrylic acid based monomer are preferred since the physical properties are favorable. The (meth)acrylic ester based polymers constituted with an acrylic ester monomer and a methacrylic ester monomer are more preferred, and the acrylic ester based polymer constituted with an acrylic ester monomer is particularly preferred.

When the organic polymer (A) is used in applications for common constructions and the like in particular, butyl acrylate based polymers constituted with a butyl acrylate based monomer are more preferred since physical properties such as low viscosity of the blend, low modulus of the cured product, high elongation, weather resistance, heat resistance and the like are demanded. Whereas, when used in applications such as applications for automobiles in which oil resistance and the like are demanded, copolymers constituted with ethyl acrylate as a principal component are more preferred. Although such polymers constituted with ethyl acrylate are superior in the oil resistance, they can be somewhat inferior in the low temperature characteristics (cold resistance), and thus a part of the ethyl acrylate may be substituted with butyl acrylate for improving the low temperature characteristics. However, as the proportion of butyl acrylate is increased, favorable oil resistance of the same may be deteriorated, therefore, the proportion of the same is preferably no greater than 40%, and more preferably no greater than 30% when the applications require oil resistance. Moreover, in order to improve the low temperature characteristics and the like without impairing the oil resistance, 2-methoxyethyl acrylate having oxygen introduced the alkyl group of the side chain, 2-ethoxyethyl acrylate and the like may also be preferably used.

However, since heat resistance is likely to be deteriorated by introducing an alkoxy group having an ether linkage in the side chain, the proportion is preferably no greater than 40% when heat resistance is needed. Taking into consideration the required physical properties such as oil resistance and heat resistance, as well as low temperature characteristics and the like to meet various types of applications and demanded objects, the proportion may be changed, whereby an appropriate polymer can be obtained. For example, although not limited thereto, copolymers of ethyl acrylate/butyl acrylate/ 2-methoxyethyl acrylate (weight ratio being 40-50/20-30/30-20) may be exemplified as examples that provide superior balance of physical properties such as oil resistance, heat resistance, and low temperature characteristics. In the present invention, these preferable monomers may be copolymerized with other monomer, or may be also subjected block copolymerization. In such cases, it is preferred that these preferable monomers be included in an amount of no less than 40% in terms of the weight ratio. In the foregoing description, for example, (meth)acrylic acid represents acrylic acid and/or methacrylic acid.

The synthesis method of the (meth)acrylic ester based polymer is not particularly limited, and any known method may be exemplified. However, polymers obtained by a common free radical polymerization method in which an azo based compound, peroxide or the like is used as a polymerization initiator generally have a value of the molecular weight distribution as great as no less than 2, and thus problems of increase in the viscosity may be involved. Therefore, living radical polymerization method is preferably employed in order to obtain a (meth)acrylic ester based polymer having low molecular weight distribution and low viscosity, and has crosslinkable functional groups at a high proportion in the molecular chain at the end.

Of the "living radical polymerization method", "atom transfer radical polymerization method" in which a (meth) acrylic ester based monomer is polymerized using an organic halide or halogenated sulfonyl compound or the like as an initiator, and a transition metal complex as a catalyst is more preferred as a method for production of a (meth)acrylic ester based polymer having a specified functional group due to halogen or the like, included at the end, which serves comparatively advantageously in a functional group transformation reaction, and a great degree of freedom in designing the initiator and the catalyst, in addition to the features of the "living radical polymerization method" as described above. Such atom transfer radical polymerization method is described in, for example, Matyjaszewski et al., J. Am. Chem. Soc., 1995, Vol. 117, p. 5614, and the like.

The organic polymer (A) constituted with these various types of main chain skeleton may be used alone, or two or more thereof may be used in combination.

On the other hand, other component such as a urethane-bond component may be included in the main chain skeleton of the organic polymer as long as the advantageous effects of the present invention are not largely damaged.

The urethane-bond component is not particularly limited, and an example thereof is a group generated by allowing an isocyanate group to react with an active hydrogen group (hereinafter, may be also referred to as amide segment).

The amide segment is a group represented by the following general formula (6):

$$—NR^6C(=O)— \quad (6)$$

(wherein, $R^6$ represents a hydrogen atom or substituted or unsubstituted organic group).

The amide segment represented by the general formula (6) is not particularly limited, and the examples include urethane groups generated by a reaction of an isocyanate group and a hydroxyl group; urea groups generated by a reaction of an isocyanate group and an amino group; functional groups having an amide bond such as thiourethane groups generated by a reaction of an isocyanate group and a mercapto group, as well as groups generated by an additional reaction of an active hydrogen in the aforementioned urethane group, urea group, and thiourethane group with an isocyanate group.

In the cured product yielded by hardening the curable composition constituted with a polymer including an urethane bond or an ester bond in the main chain, such a main chain can be cleaved by heat or the like at a part of the urethane bond or the ester bond, whereby the strength of the cured product may be significantly deteriorated. On the other hand, as described above, the organic polymer (A) of the present invention also involves polymers including a silyl group on which a substituent is provided having an urethane bond or an ester bond. However, the substituent on the silyl group that is a feature of the organic polymer (A) of the present invention is not included in the main chain that constitutes the network; therefore, it is expected that the strength of the cured product is not significantly affected even though the urethane bond or the ester bond was cleaved.

When the organic polymer (A) of the present invention includes many amide segments in the main chain skeleton, the viscosity of the polymer tends to be high. Moreover, the viscosity may be elevated after the storage, and thus the workability of the resulting composition may be lower. In addition, the amide segment can be cleaved by heat or the like as described above. Therefore, in order to obtain a composition that is superior in storage stability and workability, it is preferred that the amide segment not be substantially included. To the contrary, the curability is likely to be improved by the amide segment included in the main chain skeleton of the organic polymer (A). Accordingly, when the amide segment is included in the main chain skeleton of the organic polymer (A), the amide segment is included preferably 1 to 10 segments, more preferably 1.5 to 5 segments, and particularly preferably 2 to 3 segments per molecule, on average. When less than 1 segment is included, the curability may not be sufficient, to the contrary, when more than 10 segments are included, the polymer can have a high viscosity, thereby leading to difficulties in handling.

The curable composition in which the organic polymer (A) of the present invention is used is described in detail below.

The curable composition of the present invention includes the organic polymer (A) as a moisture curable organic polymer component that is essential. Further, in addition to the organic polymer (A), an organic polymer (C) including a silicon group represented by the general formula (7):

$$—SiR^7_{3-h}X_h \quad (7)$$

(wherein, $R^7$ that is present in the number of (3-h) each independently represents a hydrocarbon group having 1 to 20 carbon atoms, or an organosiloxy group represented by $R^8_3SiO$— (wherein, $R^8$ each independently represents a hydrocarbon group having 1 to 20 carbon atoms); X that is present in the number of "h" each independently represents a hydroxyl group or a hydrolyzable group; and "h" is any one of 1, 2, or 3) in a quantity of one or more on average per molecule, is included as needed.

The hydrolyzable group in the general formula (7) is not particularly limited, and may include any known hydrolyzable group. Examples of the hydrolyzable group include a hydrogen atom, halogen atoms, alkoxy groups, acyloxy groups, ketoxime groups, amino groups, amide groups, acid amide groups, aminooxy groups, mercapto groups, alkenyloxy groups, and the like. Among these, a hydrogen atom, alkoxy groups, acyloxy groups, ketoxime groups, amino groups, amide groups, aminooxy groups, mercapto groups and alkenyloxy groups are preferred, and alkoxy groups are more preferred in light of mild hydrolyzability and favorable handlability.

Two or more hydrolyzable groups or hydroxyl groups can be bound to the silicon atom in the general formula (7), and these groups may be the same or different.

$R^7$ in the general formula (7) is not particularly limited, and examples thereof include hydrocarbon groups, e.g., alkyl groups such as a methyl group and an ethyl group, cycloalkyl groups such as a cyclohexyl group, aryl groups such as a phenyl group, and aralkyl groups such as a benzyl group. Alternatively, triorganosiloxy groups represented by the general formula: $R^8_3SiO$—, wherein $R^8$ is a methyl group, or a phenyl group may be exemplified. Among these, a methyl group is preferred.

The organic polymer (C) represented by the general formula (7) is not particularly limited, and examples thereof include a trimethoxysilyl group, a triethoxysilyl group, a triisopropoxysilyl group, a triisopropenoxy group, a dimethoxymethylsilyl group, a diethoxymethylsilyl group, a diisopropoxymethylsilyl group, a methoxydimethylsilyl group, and an ethoxydimethylsilyl group. Among these, a trimethoxysilyl group, a triethoxysilyl group, and a dimethoxymethylsilyl group are preferred since they have a high activity to give a good curability, and a trimethoxysilyl group is more preferred. Additionally, in light of superior storage stability, a dimethoxymethylsilyl group is particularly preferred. Still further, a triethoxysilyl group is most preferred since the alcohol generated with the hydrolysis reaction of the reactive silicon group is highly safe ethanol.

Also, polymers having a reactive silicon group in which three hydrolyzable groups are included on a silicon atom are preferred since high curability can be achieved, and curable compositions having favorable recovery property, durability and creep resistance are more likely to be provided.

The method for introducing a reactive silicon group into the organic polymer (C) may be any known method, and for example, the following methods (5) to (7) may be exemplified.

(5) A polymer having a functional group such as a hydroxyl group in the molecule is allowed to react with an organic compound, which has an active group reactive to this functional group, and unsaturated group, to obtain a polymer having an unsaturated group. Alternatively, copolymerization with an epoxy compound having an unsaturated group yields a polymer having an unsaturated group. Subsequently, hydrosilane having a reactive silicon group is allowed to act on the resulting reaction product to carry out hydrosilylation.

(6) A polymer having an unsaturated group obtained in a similar manner to the method (5) is allowed to react with a compound having a mercapto group and a reactive silicon group.

(7) A polymer having a functional group such as a hydroxyl group, an epoxy group or an isocyanate group in the molecule is allowed to react with a compound having a functional group reactive to this functional group, and a reactive silicon group.

In the method (5) or the method (7) among the foregoing methods (5) to (7), the method in which a polymer having a hydroxyl group at the end is allowed to react with a compound having an isocyanate group and a reactive silicon group is preferred since a high conversion rate can be achieved within a comparatively short reaction time period. Of these, the method (5) is particularly preferred since a polymer having a reactive silicon group obtained by the method (5) forms a curable composition with lower viscosity and more favorable workability as compared with the polymer obtained by the method (7), and the polymer obtained by the method (6) may have strong odor resulting from mercaptosilane.

The hydrosilane compound used in the method (5) is not particularly limited, and the examples include halogenated silanes such as trichlorosilane, dichloromethylsilane, chlorodimethylsilane, and dichlorophenylsilane; alkoxysilanes such as trimethoxysilane, triethoxysilane, dimethoxymethylsilane, diethoxymethylsilane, dimethoxyphenylsilane, ethyldimethoxysilane, methoxydimethylsilane, and ethoxydimethylsilane; acyloxysilanes such as diacetoxymethylsilane, and diacetoxyphenylsilane; ketoximate silanes such as bis(dimethylketoximate)methylsilane, and bis(cyclohexylketoximate)methylsilane. Of these, halogenated silanes and alkoxysilanes are particularly preferred, and alkoxysilanes are more preferred since the resulting curable composition exhibits mild hydrolyzability and can be easily handled. Among alkoxysilanes, dimethoxymethylsilane is particularly preferred since it is readily available, and the curable composition including the resulting organic polymer has high curability, and superior storage stability, elongation characteristics and high tensile strength.

Among the hydrosilane compounds, trialkoxysilanes such as trimethoxysilane, triethoxysilane and triisopropoxysilane are preferred since a curable composition including the organic polymer (C) obtained by an addition reaction of a hydrosilane compound is superior in the curability.

Among the trialkoxysilanes, trialkoxysilanes including an alkoxy group having 1 carbon atom (methoxy group) such as trimethoxysilane may lead to quick progress of the disproportionation reaction, and an extremely highly reactive compound such as dimethoxysilane may be generated when the disproportionation reaction proceeds. In light of safety in handling, to use trialkoxysilane including alkoxy groups having no less than 2 carbon atoms is more preferred. In light of availability, and safety in handling, triethoxysilane is particularly preferred.

As the synthesis method (6), for example, a method in which a compound having a mercapto group and a reactive silicon group is introduced into an unsaturated bond site of a polymer in the presence of a radical initiator and/or a radical generation source by a radical addition reaction, and the like may be exemplified, but not particularly limited thereto. The compound having a mercapto group and a reactive silicon group is not particularly limited, and examples thereof include e.g., γ-mercaptopropyltrimethoxysilane, γ-mercaptopropyldimethoxymethylsilane, γ-mercaptopropyltriethoxysilane, γ-mercaptopropyldiethoxymethylsilane, mercaptomethyltriethoxysilane, and the like.

In the synthesis method (7), as the method in which the polymer having a hydroxyl group at the end is allowed to react with the compound having an isocyanate group and a reactive silicon group, for example, a method disclosed in JP-A-3-47825, and the like may be exemplified, but not particularly limited thereto. The compound having an isocyanate group and a reactive silicon group is not particularly limited, and examples thereof include e.g., γ-isocyanatepropyltrimethoxysilane, γ-isocyanatepropyldimethoxymethylsilane, γ-isocyanatepropyltriethoxysilane, γ-isocyanatepropyldiethoxymethylsilane, isocyanatemethyltrimethoxysilane, isocyanatemethyltriethoxysilane, isocyanatemethyldimethoxymethylsilane, isocyanatemethyldiethoxymethylsilane and the like.

As described above, silane compounds in which three hydrolyzable groups are bonded to one silicon atom such as trimethoxysilane may lead to progress of the disproportionation reaction. When the disproportionation reaction proceeds, fairly dangerous compounds such as dimethoxysilane may be generated. However, γ-mercaptopropyltrimethoxysilane, γ-isocyanatepropyltrimethoxysilane and the like do not lead to progress of such a disproportionation reaction. Thus, when a group in which three hydrolyzable groups are bound to one silicon atom such as trimethoxysilyl group is used as the silicon-containing group, the synthesis method (6) or (7) may be preferably used.

The organic polymer (C) may be either straight, or branched, and the number average molecular weight is preferably approximately 3,000 to 100,000, more preferably 3,000 to 50,000, and particularly preferably 3,000 to 30,000 in terms of the polystyrene equivalent measured with GPC. When the number average molecular weight is less than 3,000, the cured product is likely to be disadvantageous with respect to the elongation characteristics, while the number average molecular weight of beyond 100,000 is likely to be disadvantageous with respect to the workability due to high viscosity.

The main chain skeleton of the organic polymer (C) and the synthesis method of the same can be explained similarly to those of the organic polymer (A) described above.

The method for producing the compound that is the organic polymer (C) represented by the general formula (7), and has a polyoxyalkylene based polymer as the main chain skeleton is not particularly limited. Examples of the method include the methods for production disclosed in each publication of JP-B-45-36319 and 46-12154, JP-A-50-156599, 54-6096, 55-13767, 55-13468 and 57-164123, JP-B-3-2450, U.S. Pat. No. 3,632,557, U.S. Pat. No. 4,345,053, U.S. Pat. No. 4,366,307, U.S. Pat. No. 4,960,844 and the like, as well as the methods for production of a polyoxyalkylene based polymer having a high molecular weight (the number average molecular weight of no lower than 6,000) and a narrow molecular weight distribution (Mw/Mn is no greater than 1.6) disclosed in each publication of JP-A-61-197631, 61-215622, 61-215623 and 61-218632, JP-A-3-72527, JP-A-3-47825, JP-A-8-231707.

Although the method for producing the compound that is the organic polymer (C), and has a saturated hydrocarbon based polymer as the main chain skeleton is not particularly limited, and the example thereof include the methods for production disclosed in, each publication of, for example, JP-B-4-69659, JP-B-7-108928, JP-A-63-254149, JP-A-64-22904, JP-A-1-197509, Japanese Patent No. 2539445, Japanese Patent No. 2873395, JP-A-7-53882, and the like.

The method for producing the compound that is the organic polymer (C), and has a (meth)acrylic ester based polymer as the main chain skeleton is not particularly limited, and the example thereof include production methods in which a free radical polymerization method carried out using a chain transfer agent disclosed in each publication of JP-B-3-14068, JP-B-4-55444, JP-A-6-211922 and the like, as well as production methods in which an atom transfer radical polymerization method is used disclosed in publication of JP-A-9-272714 and the like.

The organic polymer (C) and the organic polymer (A) can be mixed at an appropriate ratio for use, and the ratio in the mixture can be selected in view of the curing speed, the stability, the cost and the like. The main chain skeletons of the organic polymer (A) and the organic polymer (C) may be of the same type or different types, and they are preferably compatible with each other.

The curable composition of the present invention includes a curing catalyst (B) as a constitutive component. The curing catalyst (B) plays a role in accelerating the reaction of the reactive silicon groups of the organic polymer (A) and the organic polymer (C) to permit hydrolysis and condensation, and allow for crosslinking.

The curing catalyst (B) is not particularly limited, and examples thereof include known catalysts such as e.g., an organic tin compound, a metal carboxylate, an amine based compound, a carboxylic acid, an alkoxy metal, an inorganic acid, and the like. However, since influences on the environment are concerned over the organic tin compounds as described above, a nonorganic tin based compound is preferably used as the curing catalyst. Further, an amine based compound and a carboxylic acid are particularly preferred since it enables the organic polymer (A) to be cured in an extremely short period of time, irrespective of being a nonorganic tin catalyst.

The amine based compound for use as the curing catalyst (B) is not particularly limited, and examples thereof include e.g., aliphatic primary amines such as methylamine, ethylamine, propylamine, isopropylamine, butylamine, amylamine, hexylamine, octylamine, 2-ethylhexylamine, nonylamine, decylamine, laurylamine, pentadecylamine, cetylamine, stearylamine, and cyclohexylamine; aliphatic secondary amines such as dimethylamine, diethylamine, dipropylamine, diisopropylamine, dibutylamine, diamylamine, dihexylamine, dioctylamine, di(2-ethylhexyl)amine, didecylamine, dilaurylamine, dicetylamine, distearylamine, methylstearylamine, ethylstearylamine, and butylstearylamine; aliphatic tertiary amines such as triamylamine, trihexylamine, and trioctylamine; aliphatic unsaturated amines such as triallylamine, and oleylamine; aromatic amines such as aniline, laurylaniline, stearylaniline, and triphenylamine; nitrogen-containing heterocyclic compounds such as pyridine, 2-aminopyridine, 2-(dimethylamino)pyridine, 4-(dimethylaminopyridine), 2-hydroxypyridine, imidazole, 2-ethyl-4-methylimidazole, morpholine, N-methylmorpholine, piperidine, 2-piperidine methanol, 2-(2-piperidino)ethanol, piperidone, 1,2-dimethyl-1,4,5,6-tetrahydropyrimidine, 1,8-diazabicyclo(5,4,0)undecene-7 (DBU), 6-(dibutylamino)-1, 8-diazabicyclo(5,4,0)undecene-7 (DBA-DBU), 1,5-diazabicyclo(4,3,0)nonene-5 (DBN), 1,4-diazabicyclo(2,2,2)octane (DABCO), and aziridine, and, as other amines, amines such as monoethanolamine, diethanolamine, triethanolamine, 3-hydroxypropylamine, ethylenediamine, propylenediamine, hexamethylenediamine, N-methyl-1,3-propanediamine, N,N'-dimethyl-1,3-propanediamine, diethylenetriamine, triethylenetetramine, 2-(2-aminoethylamino)ethanol, benzylamine, 3-methoxypropylamine, 3-lauryloxypropylamine, 3-dimethylaminopropylamine, 3-diethylaminopropylamine, 3-dibutylaminopropylamine, 3-morpholinopropylamine, 2-(1-piperazinyl)ethylamine, xylylenediamine, and 2,4,6-tris(dimethylaminomethyl)phenol; guanidines such as guanidine, phenylguanidine, and diphenylguanidine; biguanides such as butylbiguanide, 1-o-tolylbiguanide and 1-phenylbiguanide, and the like.

Among all, amidines such as 1,2-dimethyl-1,4,5,6-tetrahydropyrimidine, DBU, DBA-DBU, and DBN; guanidines such as guanidine, phenylguanidine, and diphenylguanidine; biguanides such as butylbiguanide, 1-o-tolylbiguanide and 1-phenylbiguanide are preferred since they exhibit high activities. Moreover, aryl group-substituted biguanides such as 1-o-tolylbiguanide and 1-phenylbiguanide are preferred since superior adhesiveness can be expected.

Furthermore, although amine based compounds are basic, amine based compounds having a pKa value for the conjugate acid of no less than 11 are preferred since they exhibit high catalyst activities, and 1,2-dimethyl-1,4,5,6-tetrahydropyrimidine, DBU, DBN and the like having a pKa value for the conjugate acid of no less than 12 are particularly preferred since they exhibit high catalyst activities.

Taking into consideration the ease of handling and safety, alkylamine having 5 to 20 carbon atoms is preferably used, and alkylamine having 6 to 15 carbon atoms is more preferred. When the number of carbon atoms is less than 5, volatility is likely to be elevated, whereby the odor tends to increase. When the number of carbon atoms is greater than 15, solidification at room temperatures is likely to occur, and thus it is possible to fail in achieving an efficacious action as the catalyst. Also, octylamine, 2-ethylhexylamine, laurylamine, and 3-diethylaminopropylamine are preferred since they are readily available.

According to the present invention, an amino group-containing silane coupling agent (hereinafter, may be also referred to as aminosilane) can also be used as the amine based compound for use in the curing catalyst (B). The aminosilane may involve compounds having a group that includes a silicon atom to which (a) hydrolyzable group(s) is/are bound (hereinafter, may be also referred to as hydrolyzable silicon group), and a substituted or unsubstituted amino group. The substituent of the substituted amino group is not particularly limited, and examples thereof include e.g., an alkyl group, an aralkyl group, an aryl group, and the like. Moreover, the hydrolyzable silicon group is not particularly limited, and the hydrolyzable silicon groups listed in the section of the organic polymer (A) may be exemplified. Of these, a methoxy group, and an ethoxy group are preferred since they exhibit mild hydrolyzability and are easy in handling. The number of the hydrolyzable groups bound to the silicon atom in aminosilane is preferably no less than 2, and particularly preferably no less than 3. The compound is not particularly limited, and examples thereof include e.g., γ-aminopropyltrimethoxysilane, γ-aminopropyltriethoxysilane, γ-aminopropyltriisopropoxysilane, γ-aminopropylmethyldimethoxysilane, γ-aminopropylmethyldiethoxysilane, γ-(2-aminoethyl)aminopropyltrimethoxysilane, γ-(2-aminoethyl)aminopropylmethyldimethoxysilane, γ-(2-aminoethyl)aminopropyltriethoxysilane, γ-(2-aminoethyl)aminopropylmethyldiethoxysilane, γ-(2-aminoethyl)aminopropyltriisopropoxysilane, γ-(2-(2-aminoethyl)aminoethyl)aminopropyltrimethoxysilane, γ-(6-aminohexyl)aminopropyltrimethoxysilane, 3-(N-ethylamino)-2-methylpropyltrimethoxysilane, γ-ureidepropyltrimethoxysilane, γ-ureidepropyltriethoxysilane, N-phenyl-γ-aminopropyltrimethoxysilane, N-benzyl-γ-aminopropyltrimethoxysilane, N-vinylbenzyl-γ-aminopropyltriethoxysilane, N-cyclohexylaminomethyltriethoxysilane, N-cyclohexylaminomethyldiethoxymethylsilane, N-phenylaminomethyltrimethoxysilane, (2-aminoethyl)aminomethyltrimethoxysilane, N,N'-bis[3-(trimethoxysilyl)propyl]ethylenediamine, and the like.

Of the aminosilane described above, aminosilane having an amino group ($-NH_2$) is preferred in light of the curability, and in light of the availability, γ-aminopropyltrimethoxysilane, γ-aminopropyltriethoxysilane, γ-aminopropylmethyldimethoxysilane, and γ-(2-aminoethyl)aminopropyltrimethoxysilane are preferred.

In addition, ketimine compounds that generate the aforementioned amine based compounds by hydrolysis can be also used as the curing catalyst (B) of the present invention.

The carboxylic acid which may be used as the curing catalyst (B) of the present invention is not particularly limited, and examples thereof include e.g., straight chain saturated fatty acids such as acetic acid, propionic acid, butyric acid, valeric acid, caproic acid, enanthic acid, caprylic acid, pelargonic acid, capric acid, undecanoic acid, lauric acid, tridecyl acid, myristic acid, pentadecyl acid, palmitic acid, heptadecyl acid, stearic acid, nonadecanoic acid, arachic acid, behenic acid, lignoceric acid, cerinic acid, montanic acid, melissic acid, and lacceric acid; mono-ene unsaturated fatty acids such as undecylenic acid, linderic acid, tsuzuic acid, physeteric acid, myristoleic acid, 2-hexadecenoic acid, 6-hexadecenoic acid, 7-hexadecenoic acid, palmitoleic acid, petroselinic acid, oleic acid, elaidic acid, asclepic acid, vaccenic acid, gadoleic acid, gondoic acid, cetoleic acid, erucic acid, brassylic acid, selacholeic acid, ximenic acid, rumenic acid, acrylic acid, methacrylic acid, angelic acid, crotonic acid, isocrotonic acid, and 10-undecenoic acid; polyene unsaturated fatty acids such as linoelaidic acid, linoleic acid, 10,12-octadecadienic acid, hiragonic acid, a-eleostearic acid, 8-eleostearic acid, punicic acid, linolenic acid, 8,11,14-eicosatrienoic acid, 7,10,13-docosatrienoic acid, 4,8,11,14-hexadecatetraenoic acid, moroctic acid, stearidonic acid, arachidonic acid, 8,12,16,19-docosatetraenoic acid, 4,8,12,15,18-eicosapentaenoic acid, clupanodonic acid, herring acid, and docosahexaenoic acid; branched fatty acids such as 2-methylbutyric acid, isobutyric acid, 2-ethylbutyric acid, pivalic acid, 2,2-dimethylbutyric acid, 2-ethyl-2-methylbutyric acid, 2,2-diethylbutyric acid, 2-phenylbutyric acid, isovaleric acid, 2,2-dimethyl valeric acid, 2-ethyl-2-methylvaleric acid, 2,2-diethylvaleric acid, 2-ethylhexanoic acid, 2,2-dimethylhexanoic acid, 2,2-diethylhexanoic acid, 2,2-dimethyloctanoic acid, 2-ethyl-2,5-dimethylhexanoic acid, versatic acid, neodecanoic acid, and tuberculostearic acid; fatty acids having a triple bond such as propiolic acid, tariric acid, stearolic acid, crepenynic acid, ximenynic acid, and 7-hexadecinic acid; alicyclic carboxylic acids such as naphthenic acid, malvalinic acid, sterculic acid, hydnocarpic acid, chaulmoogric acid, gorlic acid, 1-methylcyclopentanecarboxylic acid, 1-methylcyclohexanecarboxylic acid, 1-adamantanecarboxylic acid, bicyclo[2.2.2]octane-1-carboxylic acid, and bicyclo[2.2.1]heptane-1-carboxylic acid; oxygen-containing fatty acids such as acetoacetic acid, ethoxyacetic acid, glyoxylic acid, glycolic acid, gluconic acid, sabinic acid, 2-hydroxytetradecanoic acid, ipurolic acid, 2-hydroxyhexadecanoic acid, jarapinolic acid, juniperinic acid, ambrettolic acid, aleuritic acid, 2-hydroxyoctadecanoic acid, 12-hydroxyoctadecanoic acid, 18-hydroxyoctadecanoic acid, 9,10-dihydroxyoctadecanoic acid, 2,2-dimethyl-3-hydroxypropionic acid, ricinoleic acid, kamlolenic acid, licanic acid, phellonic acid, and cerebronic acid; halogen-substituted monocarboxylic acids such as chloroacetic acid, 2-chloroacrylic acid, and chlorobenzoic acid, and the like. Examples of aliphatic dicarboxylic acid include chain dicarboxylic acids such as adipic acid, azelaic acid, pimelic acid, suberic acid, sebacic acid, glutaric acid, oxalic acid, malonic acid, ethylmalonic acid, dimethyl malonic acid, ethylmethylmalonic acid, diethyl malonic acid, succinic acid, 2,2-dimethylsuccinic acid, 2,2-diethylsuccinic acid, and 2,2-dimethyl glutaric acid; saturated dicarboxylic acids such as 1,2,2-trimethyl-1,3-cyclopentanedicarboxylic acid, and oxydiacetic acid; unsaturated dicarboxylic acids such as maleic acid, fumaric acid, acetylene dicarboxylic acid, and itaconic acid, and the like. Examples of aliphatic polycarboxylic acid include chain tricarboxylic acids such as aconitic acid, citric acid, isocitric acid, 3-methylisocitric acid, and 4,4-dimethyl aconitic acid, and the like. Examples of the aromatic carboxylic acid include aromatic monocarboxylic acids such as benzoic acid, 9-anthracenecarboxylic acid, atrolactic acid, anisic acid, isopropyl benzoic acid, salicylic acid, and toluoyl acid; aromatic polycarboxylic acids such as phthalic acid, isophthalic acid, terephthalic acid, carboxyphenylacetic acid, and pyromellitic acid, and the like. In addition, amino acids such as alanine, leucine, threonine, aspartic acid, glutamic acid, arginine, cysteine, methionine, phenylalanine, tryptophan and histidine, and the like may be also exemplified. Furthermore, a carboxylic acid derivative that generates a carboxylic acid upon hydrolysis such as carboxylic acid anhydride, ester, amide, nitrile, acyl chloride or the like can be also used.

The carboxylic acid which may be used as the curing catalyst (B) is preferably 2-ethylhexanoic acid, octylic acid, neodecanoic acid, oleic acid, naphthenic acid or the like in light of favorable availability, low cost, satisfactory compatibility with the organic polymer (A) and the organic polymer (C), and the like.

Examples of the curing catalyst (B) other than the amine based compound and the carboxylic acid include e.g., metal carboxylate salts such as tin carboxylate, lead carboxylate, bismuth carboxylate, potassium carboxylate, calcium carboxylate, barium carboxylate, titanium carboxylate, zirconium carboxylate, hafnium carboxylate, vanadium carboxylate, manganese carboxylate, iron carboxylate, cobalt carboxylate, nickel carboxylate, and cerium carboxylate; titanium compounds such as tetrabutyl titanate, tetrapropyl titanate, titanium tetrakis(acetylacetonato), diisopropoxytitanium bis(acetylacetonato), and diisopropoxytitanium bis(ethylacetoacetate); organic tin compounds such as dibutyltin dilaurate, dibutyltin maleate, dibutyltin phthalate, dibutyltin dioctanoate, dibutyltin bis(2-ethylhexanoate), dibutyltin bis(methylmaleate), dibutyltin bis(ethylmaleate), dibutyltin bis(butylmaleate), dibutyltin bis(octylmaleate), dibutyltin bis(tridecylmaleate), dibutyltin bis(benzylmaleate), dibutyltin diacetate, dioctyltin bis(ethylmaleate), dioctyltin bis(octylmaleate), dibutyltin dimethoxide, dibutyltin bis(nonylphenoxide), dibutenyltin oxide, dibutyltin oxide, dibutyltin bis(acetylacetonato), dibutyltin bis(ethylacetoacetonato), and reaction products of dibutyltin oxide with a silicate compound, reaction products of dibutyltin oxide with a phthalate ester, and the like; aluminum compounds such as aluminum tris(acetylacetonato), aluminum tris(ethylacetoacetate), and diisopropoxyaluminum ethylacetoacetate; zirconium compounds such as zirconium tetrakis(acetylacetonato); various types of metal alkoxides such as tetrabutoxy hafnium; organic acidic phosphate esters; organic sulfonic acids such as trifluoromethanesulfonic acid; inorganic acids such as hydrochloric acid, phosphoric acid, and boronic acid. For the grounds described above and the like, the amount of the organic tin compound used is preferably no greater than 5 parts by weight, more preferably no greater than 0.5 parts by weight, and still more preferably no greater than 0.05 parts by weight based on 100 parts by weight of total amount of the organic polymer (A) and the organic polymer (C). It is particularly preferred that the organic tin compound is not substantially included, and it is most preferred that any organic tin compound is not included. The phrase "not substantially including the organic tin catalyst" referred to herein means that the content of the organic tin compound used as the curing catalyst (B) is no greater than 0.01 parts by weight based on 100 parts by weight of total amount of the organic polymer (A) and the organic polymer (C).

As the curing catalyst (B), two different kinds of the catalysts may be used in combination. For example, to use the aforementioned amine based compound and the carboxylic acid in combination may be preferred since it is possible to achieve the effect of improving the curability.

The amount of the curing catalyst (B) used is preferably 0.001 to 20 parts by weight, still more preferably 0.01 to 15 parts by weight, and particularly preferably 0.01 to 10 parts by weight based on 100 parts by weight of total amount of the organic polymer (A) and the organic polymer (C). When the amount of the curing catalyst (B) blended is less than 0.001 parts by weight, the attained curing speed can be insufficient, and it may be difficult to allow the curing reaction to proceed enough. To the contrary, when the amount of the curing catalyst (B) blended exceeds 20 parts by weight, the curing speed is excessively accelerated, whereby the usable time of the curable composition may be so short that the workability may be deteriorated. Furthermore, some of the curing catalysts (B) may exude onto the surface of the cured product after hardening of the curable composition, or may stain the surface of the cured product. However, the organic polymer (A) of the present invention can exhibit sufficient curability even with a small amount of the curing catalyst. In such a case, by using the curing catalyst (B) in an amount of 0.01 to 1.0 parts by weight, the surface state of the cured product can be kept favorable while securing the curability.

To the curable composition of the present invention may be added an adhesion-imparting agent such as a silane coupling agent as needed. The curable composition of the present invention may include a silane coupling agent as an adhesion-imparting agent. The silane coupling agent herein referred to is a compound having a hydrolyzable silicon group and other functional group in the molecule, and exhibits an effect of markedly improving adhesiveness of the curable composition to various types of adherends, i.e., inorganic materials such as glass, aluminum, stainless, zinc, copper and mortar, and organic materials such as polyvinyl chloride, polyacrylate, polyester, polyethylene, polypropylene and polycarbonate under non-primer conditions or primer treated conditions.

When the silane coupling agent us used under non-primer conditions, the effect of improving the adhesiveness on the various types of adherends may be particularly prominently exhibited. Additionally, the silane coupling agent can also serve as a physical property adjustor, a dispersibility improving agent, and the like.

Examples of the hydrolyzable silicon group in the silane coupling agent include the groups represented by the general formula (7), wherein Z represents a hydrolyzable group. For example, groups exemplified above as the hydrolyzable group in the section of the organic polymer (A) may be included, and of these, a methoxy group, an ethoxy group and the like are preferred in light of the hydrolysis rate. The number of the hydrolyzable group in the silane coupling agent is preferably no less than 2, and particularly preferably no less than 3.

Examples of the functional group other than the hydrolyzable silicon group which may be included in the silane coupling agent include substituted or unsubstituted amino groups, mercapto groups, epoxy groups, carboxyl groups, vinyl groups, isocyanate groups, isocyanurate, halogen, and the like. Of these, substituted or unsubstituted amino groups, epoxy groups, isocyanate groups, isocyanurate and the like are preferred because of superior effect of improving the adhesiveness, and amino groups are particularly preferred.

Although the silane coupling agents having both a hydrolyzable silicon group and an amino group are generally referred to as aminosilane, aminosilane also serves as the curing catalyst (B) in the present invention, and specific examples thereof include aminosilane illustrated in the section of the curing catalyst (B), and the like. In addition, when achieving a greater function as an adhesion-imparting agent is desired, the aminosilane may be used in an amount of no less than the needed amount as the curing catalyst.

The silane coupling agent other than aminosilane is not particularly limited, and examples thereof include e.g., isocyanate silanes such as γ-isocyanatepropyltrimethoxysilane, γ-isocyanatepropyltriethoxysilane, γ-isocyanatepropylmethyldiethoxysilane, γ-isocyanatepropylmethyldimethoxysilane, (isocyanatemethyl)trimethoxysilane, and (isocyanatemethyl)dimethoxymethylsilane; carbamatesilanes such as methyl trimethoxysilylpropylcarbamate, methyl trimethoxysilylmethylcarbamate, methyl dimethoxymethylsilylmethylcarbamate, methyl triethoxysilylmethylcarbamate; ketimine type silanes such as N-(1,3-dimethylbutylidene)-3-(triethoxysilyl)-1-propaneamine; mercaptosilanes such as γ-mercaptopropyltrimethoxysilane, γ-mercaptopropyltriethoxysilane, γ-mercaptopropylmethyldimethoxysilane, γ-mercaptopropylmethyldiethoxysilane, and mercaptomethyltriethoxysilane; epoxysilanes such as γ-glycidoxypropyltrimethoxysilane, γ-glycidoxypropyltriethoxysilane, γ-glycidoxypropylmethyldimethoxysilane, β-(3,4-epoxycyclohexyl)ethyltrimethoxysilane, and β-(3,4-epoxycyclohexyl)ethyltriethoxysilane; carboxysilanes such as β-carboxyethyltriethoxysilane, β-carboxyethylphenyl bis (2-methoxyethoxy)silane, and N-β-(carboxymethyl)aminoethyl-γ-aminopropyltrimethoxysilane; vinyl type unsaturated group-containing silanes such as vinyltrimethoxysilane, vinyltriethoxysilane, γ-methacryloyloxypropylmethyldimethoxysilane, and γ-acryloyloxypropyltriethoxysilane; halogen-containing silanes such as γ-chloropropyltrimethoxysilane, chloromethyltrimethoxysilane; isocyanurate silanes such as tris(3-trimethoxysilylpropyl)isocyanurate, and the like. Additionally, reaction products of the aforementioned aminosilane with epoxysilane, reaction products of the aminosilane with isocyanate silane, reaction products of the aminosilane with (meth)acryloyloxy group-containing silane, and the like may also be used. Condensates obtained by allowing the aforementioned silanes to be partially condensed can also be used. Moreover, derivatives yielded by modification of these, such as amino-modified silyl polymers, silylated amino polymers, unsaturated aminosilane complexes, phenylamino long-chain alkylsilane, aminosilylated silicone, silylated polyesters, and the like can also be used as the silane coupling agent.

The curable composition of the present invention may be used by adding only one kind of the silane coupling agent to the composition, or two or more kinds of the same may be added in combination.

The amount of the silane coupling agent used in the present invention is preferably 0.01 to 20 parts by weight, more preferably 0.1 to 10 parts by weight, and particularly preferably 1 to 7 parts by weight based on 100 parts by weight of the organic polymer (A) and the organic polymer (C). When the amount is below this range, i.e., less than 0.01 parts by weight, the adhesiveness may not be satisfactorily achieved. In contrast, when the amount is more than 20 parts by weight curing speed satisfactory for practical applications may not be achieved, or sufficient progress of the curing reaction can be difficult.

As the adhesion-imparting agent, a compound other than the silane coupling agent can be also used, and specific examples thereof which can be used include, but not particularly limited thereto, e.g., epoxy resins, phenol resins, sulfur, alkyl titanates, aromatic polyisocyanate, and the like. These adhesion-imparting agents may be used alone, or two or more kinds may be used as a mixture.

A filler can be also added to the curable composition of the present invention to meet the application. The filler is not particularly limited, and examples thereof include e.g., reinforcing fillers such as fume silica, precipitated silica, crystalline silica, molten silica, dolomite, anhydrous silicic acid, hydrous silicic acid, and carbon black; fillers such as heavy calcium carbonate, colloidal calcium carbonate, magnesium carbonate, diatomaceous earth, baked clay, clay, talc, titanium oxide, bentonite, organic bentonite, ferric oxide, aluminum fine powder, flint powder, zinc oxide, active zinc oxide, Shirasu Balloon, glass microballoon, organic microballoon of a phenol resin or a vinylidene chloride resin, resin powders such as PVC powder of a chloride resin and PMMA powder; fibrous fillers such as glass fiber and filament, and the like. When the filler is used, the amount is preferably 1 to 250 parts by weight, and more preferably 10 to 200 parts by weight based on 100 parts by weight of total amount of the organic polymer (A) and the organic polymer (C).

The filler can also be dehydrated and dried beforehand by mixing uniformly with a dehydrating agent such as calcium oxide, and thereafter enclosing in a bag constituted with an airtight material, followed by leaving to stand for an appropriate period of time as disclosed in JP-A-2001-181532. By using such a filler having a low water content, the storage stability can be improved when one-component composition is prepared, in particular.

In addition, when a composition having high transparency is to be obtained, as disclosed in JP-A-11-302527, a polymer powder of a raw material polymer such as methyl methacrylate, or amorphous silica can be used as the filler. In addition, as disclosed in JP-A-2000-38560, by using as a filler hydrophobic silica that is a silicon dioxide fine powder having a hydrophobic group bound on the surface thereof, a highly transparent composition can be obtained. Although the surface of the silicon dioxide fine powder generally presents a silanol group (—SiOH), hydrophobic silica is provided by allowing this silanol group to react with an organic silicon halide, an alcohol or the like to produce a —SiO— hydrophobic group. Specifically, dimethylsiloxane, hexamethyldisilazane, dimethyldichlorsilane, trimethoxyoctylsilane, trimethylsilane or the like is allowed to bind to the silanol group being present on the surface of the silicon dioxide fine powder. The silicon dioxide fine powder having the surface formed with a silanol group (—SiOH) is referred to as hydrophilic silica fine powder.

When production of a cured product with greater strength is desired by using such a filler, a filler selected predominantly from fume silica, precipitated silica, crystalline silica, molten silica, dolomite, anhydrous silicic acid, hydrous silicic acid, carbon black, surface-treated fine calcium carbonate, baked clay, clay, and active zinc oxide is preferably used in an amount falling within the range of 1 to 200 parts by weight based on 100 parts by weight of total amount of the organic polymer (A) and the organic polymer (C), thereby capable of leading to preferable results. In addition, when production of a cured product with less strength and great elongation upon fracture is desired, a filler selected predominantly from titanium oxide, calcium carbonate such as heavy calcium carbonate, magnesium carbonate, talc, ferric oxide, zinc oxide, and Shirasu balloon is preferably used in an amount falling within the range of 5 to 200 parts by weight based on 100 parts by weight of the polymer having a reactive silicon group, thereby capable of leading to preferable results. In general, as the larger specific surface area value of calcium carbonate is provided, the greater effect of improvement of the strength at break, elongation at break and adhesiveness of the cured product can be exhibited. These fillers may be used alone, or two or more of them may be used as a mixture, as a matter of course. When calcium carbonate is employed, to use surface-treated fine calcium carbonate and calcium carbonate having a great particle size such as heavy calcium carbonate in combination is desired. The surface-treated fine calcium carbonate has a particle size of preferably no greater than 0.5 µm, and the surface treatment is preferably carried out with a fatty acid, a fatty acid salt or the like. In addition, the calcium carbonate having a great particle size has a particle size of preferably no less than 1 µm, and those not subjected to the surface treatment can be used.

In order to improve the workability (anti-sagging and the like) of the composition, and to make the surface of the cured product matt, addition of an organic balloon or an inorganic balloon is preferred. These fillers can be also subjected to a surface treatment, and may be used alone, or two or more of them may be used as a mixture. In order to improve the workability (anti-sagging and the like), the balloon has a particle size of preferably no greater than 0.1 mm. In order to make the surface of the cured product matt, the particle size is preferably 5 to 300 µm.

The curable composition of the present invention provides favorable chemical resistance and the like. Therefore the composition can be suitably used for joints of the housing outer walls, which include siding boards, particularly ceramic siding board, and the like, and for adhesives of outer wall tiles, which will be left on the joints as the adhesives are applied. And it is desired that the design of outer walls is in harmony with the design of the sealant. In particular, the composition is used for high-quality outer walls by sputtering painting, admixing with a coloring aggregate, or the like. When the curable composition of the present invention is blended with a scaly or granular substance having a diameter of no less than 0.1 mm, and preferably about 0.1 to 5.0 mm, the cured product will be in harmony with such high-quality outer walls, and the external appearance of the cured product is maintained over a long term since the cured product is excellent in chemical resistance. In such cases, sand spread type or sand stone type outer walls with a rough texture surface can be formed when a granular substance is used, while when a scaly substance is used, irregular surface is formed resulting from the scales.

Preferable diameter, blend amount, material and the like of the scaly or granular substance is as follows, as disclosed in JP-A-9-53063.

The diameter may be no less than 0.1 mm, and preferably about 0.1 to 5.0 mm, which is suitably determined to have a size that meets the quality of the material, the pattern and the like of the outer wall. Those having a diameter of about 0.2 mm to 5.0 mm, or about 0.5 mm to 5.0 mm can be also used. When the scaly substance is used, the thickness may be approximately 1/10 to 1/5 of the diameter (about 0.01 to 100 mm). The scaly or granular substance may be beforehand mixed in the sealing base compound and carried to the operation site in the form of a sealing compound, or mixed in the sealing base compound at the operation site upon use.

The scaly or granular substance may be blended in an amount of about 1 to 200 parts by weight based on 100 parts by weight of the composition such as a sealing compound, an adhesive and the like. The blending amount may be determined appropriately depending on the size of each scaly or granular substance, and the quality of the material, pattern and the like of the outer wall.

As the scaly or granular substance, a natural product such as silica sand or mica, a synthetic rubber, a synthetic resin, an inorganic substance such as alumina may be used. In order to improve the designability when filled in the joint part, it is colored to have an adequate color in accordance with the material, the pattern and the like of the outer wall.

Preferable finishing method and the like are disclosed in JP-A-9-53063.

Furthermore, when balloons (preferably, mean particle diameter being no less than 0.1 mm) are used for similar objects, a surface with sand spread type or sand stone type rough texture is provided, and weight saving can be implemented. Preferable diameter, blending amount, material and the like of the balloon are as follows, as disclosed in JP-A-10-251618.

The balloon is a spherical filler having a hollow space inside. Examples of the material of this balloon include inorganic materials such as glass, Shirasu and silica, and organic materials such as phenol resins, urea resins, polystyrene and saran, but not limited just thereto. The inorganic material and the organic material may also be conjugated, or laminated, thereby capable of forming multiple layers. An inorganic or organic balloon, or conjugated balloon of these may be used. Furthermore, as the balloon, single type of the balloon may be used, or multiple types of mixed balloons may be also used with different kinds of materials. Moreover, the balloon which may be used can have the surface subjected to processing or coating, alternatively, one having the surface treated with any of various types of surface treating agents can also be used. For example, the organic balloon may be coated with calcium carbonate, talc, titanium oxide or the like, or the inorganic balloon may be subjected to a surface treatment with a silane coupling agent, or the like.

In order to obtain the surface having a sand spread type or sand stone type rough texture, the balloon has a particle size of preferably no less than 0.1 mm. Those having a particle size of about 0.2 mm to 5.0 mm, or about 0.5 mm to 5.0 mm can also be used. Those having a particle size of less than 0.1 mm may not provide the rough texture but just increase the viscosity of the composition even though they are blended in a large amount. The blending amount of the balloon can be readily determined depending on the degree of the intended sand spread type or sand stone type rough texture. In general, it is desired to blend one having a particle size of no less than 0.1 mm at a proportion by volume concentration in the composition falling within the range of 5 to 25% by volume. The volume concentration of the balloon being less than 5% by volume may lead to failure in providing rough texture, while the volume concentration exceeding 25% by volume is likely to result in increase in the viscosity of the sealing material or the adhesive, accompanied by inferior workability, elevated modulus of the cured product, and thus basic performances of the sealing material or the adhesive tend to be deteriorated. The volume concentration which can result in particularly preferable balance with the basic performances of the sealing material is 8 to 22% by volume.

When the balloon is used, such an antislipping agent as disclosed in JP-A-2000-154368, such an amine based compound for making the surface of the cured product not only irregular but also matt as disclosed in JP-A-2001-164237, particularly primary and/or secondary amines having a melting point of no lower than 35° C. may be included.

Specific examples of the balloon include those disclosed in each publication of JP-A-2-129262, JP-A-4-8788, JP-A-4-173867, JP-A-5-1225, JP-A-7-113073, JP-A-9-53063, JP-A-10-251618, JP-A-2000-154368, JP-A-2001-164237, WO97/05201 and the like.

Additionally, a thermally expandable particulate hollow body disclosed in each publication of JP-A-2004-51701, JP-A-2004-66749 or the like can be used as the balloon. The thermally expandable particulate hollow body refers to a plastic spherical body in which a compound having a low boiling point such as hydrocarbon having 1 to 5 carbon atoms is packed in a polymer outer shell material (vinylidene chloride based copolymer, acrylonitrile based copolymer, or vinylidene chloride-acrylonitrile copolymer) to give a sphere. By heating the adhesion portion formed using the present composition, the gas pressure in the shell of the thermally expandable particulate hollow body is increased, thereby dramatically expanding the volume through softening of the polymer outer shell material, which plays a role in detaching the adhesive interface. Addition of the thermally expandable particulate hollow body enables simple detachment by merely heating when it is unnecessary without being accompanied by disruption of the material, and thus a heat detachable adhesive composition can be obtained without using any organic solvent at all.

Also in the case in which the curable composition of the present invention includes particles of a sealing material cured product, the surface of the cured product will have irregularity formed thereon, and the designability can be improved. Preferable diameter, blending amount, material and the like of the particles of the sealing material cured product are as follows, as disclosed in JP-A-2001-115142. The diameter is 0.1 mm to 1 mm, and preferably approximately 0.2 to 0.5 mm. The blending amount in the curable composition is preferably 5 to 100% by weight, and more preferably 20 to 50% by weight. The material may be an urethane resin, silicone, modified silicone, a polysulfide rubber or the like, and not limited as long as it is a material which can be used as a sealing material, but a sealing material of modified silicone base is preferred.

Further, silicate may be added into the curable composition of the present invention the present invention as needed. This silicate acts as a crosslinking agent, and has a function of improving the recovery property, durability, and creep resistance of the cured product obtained from the curable composition of the present invention. Additionally, effects of improving the adhesiveness and water resistant adhesiveness, as well as adhesion durability under high temperature and high humid conditions can be also expected. Tetraalkoxysilane or partially hydrolyzed condensate thereof can be used as silicate. When the silicate is used, the amount is preferably 0.1 to 20 parts by weight, and more preferably 0.5 to 10 parts by weight based on 100 parts by weight of total amount of the organic polymer (A) and the organic polymer (C).

The silicate is not particularly limited, and examples thereof include e.g., tetraalkoxysilane (tetraalkylsilicate) such as tetramethoxysilane, tetraethoxysilane, ethoxytrimethoxysilane, dimethoxydiethoxysilane, methoxytriethoxysilane, tetra-n-propoxysilane, tetra-i-propoxysilane, tetra-n-butoxysilane, tetra-i-butoxysilane and tetra-t-butoxysilane, and partially hydrolyzed condensates thereof.

The partially hydrolyzed condensate of tetraalkoxysilane is more preferable since the organic polymer of the present invention will have more superior effects of improvement of the recovery property, durability, and creep resistance as compared with those of tetraalkoxysilane.

As the partially hydrolyzed condensate of the tetraalkoxysilane, for example, products obtained by adding water to tetraalkoxysilane, followed by allowing for partial hydrolysis and condensation with a common method may be included. In addition, commercially available partially hydrolyzed condensate of organosilicate compound can also be used. Examples of such condensates include e.g., Methylsilicate 51, Ethylsilicate 40 (both manufactured by COLCOAT CO., Ltd.), and the like.

A plasticizer can be added to the curable composition of the present invention as needed. By adding a plasticizer, the viscosity and the slump property of the curable composition, as well as mechanical properties such as tensile strength, elongation and the like of the cured product obtained by hardening the composition can be adjusted. The plasticizer is not particularly limited, and examples thereof include e.g., phthalate esters such as dibutyl phthalate, diheptyl phthalate, bis(2-ethylhexyl)phthalate, and butylbenzyl phthalate; non-aromatic dibasic acid esters such as dioctyl adipate, dioctyl sebacate, dibutyl sebacate, and isodecyl succinate; aliphatic esters such as butyl oleate, and methyl acetyl lysylinolate; phosphate esters such as tricresyl phosphate, and tributyl phosphate; trimellitic acid esters; chlorinated paraffins; hydrocarbon based oils such as alkyldiphenyl, and partially hydrogenated terphenyl; process oils; epoxy plasticizers such as epoxidized soybean oil, and benzyl epoxystearate.

Moreover, in addition to the aforementioned plasticizer, a polymeric plasticizer can also be used by addition. When a polymeric plasticizer is used, in comparison with the case in which a low molecular plasticizer (monomeric plasticizer) that is a plasticizer not including a polymer component in the molecule is used, initial physical properties may be maintained for a longer term. Moreover, drying properties (also referred to as paintability) can be improved when an alkyd paint is applied to the cured product. The polymeric plasticizer is not particularly limited, and examples thereof include: vinyl based polymers obtained by polymerization of a vinyl based monomer by a variety of methods; esters of polyalkylene glycol such as diethylene glycol dibenzoate, triethylene glycol dibenzoate, and pentaerythritol ester; polyester based plasticizers obtained from dibasic acid such as sebacic acid, adipic acid, azelaic acid or phthalic acid, and dihydric alcohol such as ethylene glycol, diethylene glycol, triethylene glycol, propylene glycol, and dipropylene glycol; polyether polyol such as polyethylene glycol, polypropylene glycol and polytetramethylene glycol having a molecular weight of no less than 500 and more preferably no less than 1,000, or polyethers such as derivatives prepared by converting the hydroxyl group of these polyether polyols into an ester group, an ether group or the like; polystyrenes such as polystyrene and poly-α-methylstyrene; polybutadiene, polybutene, polyisobutylene, butadiene-acrylonitrile, polychloroprene, and the like.

Among these polymeric plasticizers, those compatible with the organic polymer (A) and the organic polymer (C) are preferred. In this respect, polyethers and vinyl based polymers are preferred. Furthermore, to use a polyether as the plasticizer is preferred since surface curability and curability in deep section are improved, and the composition does not undergo curing delay after storage. In particular, polypropylene glycol is more preferred of these. Additionally, in light of the miscibility and weather resistance as well as heat resistance, vinyl based polymers are preferred. Among the vinyl based polymers, acrylic polymers and/or methacryl based polymers are preferred, and acrylic polymers such as polyacrylic acid alkyl esters are more preferred. The synthesis method of this polymer is preferably a living radical polymerization which enables narrowing of the molecular weight distribution and lowering of viscosity, and an atom transfer radical polymerization is more preferred.

Also, to use a polymer by a SGO process, generally referred to, which was obtained by continuous bulk polymerization of an alkyl acrylate monomer at a high temperature and a high pressure as disclosed in JP-A-2001-207157 is preferred.

The polymeric plasticizer has a number average molecular weight of preferably 500 to 15,000, more preferably 800 to 10,000, still more preferably 1,000 to 8,000, and particularly preferably 1,000 to 5,000. The number average molecular weight is most preferably 1,000 to 3,000. When the molecular weight is too low, the plasticizer outflows in a time dependent manner due to heat, rainfall and the like, initial physical properties cannot be maintained for a long term. This event will be the cause of pollution resulting from dust adhesion and the like, and also the alkyd painting performance cannot be improved. In addition, too high molecular weight may result in too high viscosity, leading to inferior workability. The molecular weight distribution of the polymeric plasticizer is not particularly limited, but it is preferably as narrow as possible, which may be less than 1.80. The molecular weight distribution is more preferably no greater than 1.70, still more preferably no greater than 1.60, even more preferably no greater than 1.50, particularly preferably no greater than 1.40, and most preferably no greater than 1.30.

In the case of the polyether based polymer, the number average molecular weight thereof is determined by a terminal group analysis method, while in the case of other polymers, it is determined by a GPC method. Moreover, the molecular weight distribution (Mw/Mn) is determined also by a GPC method (in terms of the polystyrene equivalent).

Further, the polymeric plasticizer which can be used may be either a compound having a reactive silicon group, or a compound not having a reactive silicon group. When the reactive silicon group is included, it acts as a reactive plasticizer, transfer of the plasticizer from the cured product can be prevented. When the reactive silicon group is included, its number is preferably no greater than 1, and more preferably no greater than 0.8 on average per molecule. When the plasticizer having a reactive silicon group, particularly an oxyalkylene polymer having a reactive silicon group is used, the number average molecular weight is preferably lower than the organic polymer (A) and the organic polymer (C). When the number average molecular weight of the oxyalkylene polymer is higher than those of the organic polymer (A) and the organic polymer (C), the plasticizing effect may not be achieved.

The plasticizer may be used alone, or two or more thereof may be used in combination. Alternatively, the low molecular plasticizer and the polymeric plasticizer may be used in combination. Also, these plasticizers can be blended in production of the polymer.

The amount of the plasticizer used is 5 to 150 parts by weight, preferably 10 to 120 parts by weight, and more preferably 20 to 100 parts by weight based on 100 parts by weight of total amount of the organic polymer (A) and the organic polymer (C). When the amount is less than 5 parts by weight, the effect as a plasticizer may not be exhibited, while the amount exceeding 150 parts by weight may lead to deficiency of the mechanical strength of the cured product.

A tackifier may be added to the curable composition of the present invention as needed. Although the tackifier is not particularly limited, generally known one can be used irrespective of the state at ordinary temperatures, which may be either a solid or liquid. Examples include styrene based block copolymers, hydrogenated products thereof, phenol resins, modified phenol resins (for example, cashew oil-modified phenol resins, tall oil-modified phenol resins and the like), terpenephenol resins, xylene-phenol resins, cyclopentadiene-phenol resins, coumarone-indene resins, rhodine based resins, rhodine ester resins, hydrogenated rhodine ester resins, xylene resins, low molecular weight polystyrene based resins, styrene copolymer resins, petroleum resins (for example, C5 hydrocarbon resins, C9 hydrocarbon resins, C5 C9 hydrocarbon copolymerized resins and the like), hydrogenated petroleum resins, terpene based resins, DCPD resins, petroleum resins, and the like. These may be used alone, or two or more thereof may be used in combination. As the styrene based block copolymers and hydrogenated products thereof, styrene-butadiene-styrene block copolymers (SBS), styrene-isoprene-styrene block copolymers (SIS), styrene-ethylene butylene-styrene block copolymers (SEBS), styrene-ethylene propylene-styrene block copolymers (SEPS), styreneisobutylene-styrene block copolymers (SIBS), and the like. The tackifying resin may be used alone, or two or more thereof may be used in combination.

The tackifying resin may be used in an amount of falling within the range of preferably 5 to 1,000 parts by weight, and more preferably 10 to 100 parts by weight based on 100 parts by weight of total amount of the organic polymer (A) and the organic polymer (C).

A solvent or diluent may be added to the curable composition of the present invention as needed. The solvent and the diluent are not particularly limited, and examples thereof include e.g., aliphatic hydrocarbons, aromatic hydrocarbons, alicyclic hydrocarbons, halogenated hydrocarbons, alcohols, esters, ketones, ethers and the like. When the solvent or diluent is used, the solvent has a boiling point of preferably no lower than 150° C., more preferably no lower than 200° C., and particularly preferably no lower than 250° C. in view of the problems of air pollution which may be caused when the composition is used indoors. The solvent or diluent may be used alone, or two or more thereof may be used in combination.

A physical property adjustor which adjusts the tensile characteristics of the resulting cured product may be added to the curable composition of the present invention as needed. Although the physical property adjustor is not particularly limited, for example, alkylalkoxysilanes such as methyltrimethoxysilane, dimethyldimethoxysilane, trimethylmethoxysilane, and n-propyltrimethoxysilane; alkylisopropenoxysilane such as dimethyl diisopropenoxysilane and methyltriisopropenoxysilane, alkoxysilanes having an unsaturated group such as vinyltrimethoxysilane and vinyldimethylmethoxysilane; silicone varnishes; polysiloxanes, and the like may be exemplified. By using the physical property adjustor, the hardness can be increased or decreased to the contrary in hardening of the curable composition of the present invention, or the elongation upon fracture can be elicited. The aforementioned physical property adjustor may be used alone, or two or more thereof may be used in combination.

Particularly, compounds that produce a compound having a monovalent silanol group in the molecule by hydrolysis have an effect of lowering the modulus of the cured product without deteriorating the tack of the surface of the cured product. Particularly, compounds that produce trimethyl silanol are preferred. As the compound that produces a compound having a compound having a monovalent silanol group in the molecule by hydrolysis, compounds disclosed in JP-A-5-117521 may be exemplified. In addition, compounds, which are derivatives of alkyl alcohol such as hexanol, octanol or decanol, that produce a silicon compound that produces $R_3SiOH$ such as trimethyl silanol by hydrolysis; and compounds, which are derivatives of polyhydric alcohol having no less than 3 hydroxyl groups such as trimethylolpropane, glycerin, pentaerythritol or sorbitol, that produce a silicon compound that produces $R_3SiOH$ such as trimethyl silanol by hydrolysis disclosed in JP-A-11-241029 may be exemplified.

Moreover, compounds, which are derivatives of oxypropylene polymer, that produce a silicon compound that produces $R_3SiOH$ such as trimethyl silanol by hydrolysis as disclosed in JP-A-7-258534 may be also exemplified. Additionally, polymers having a silicon-containing group which can be a monosilanol-containing compound by hydrolysis and a crosslinkable hydrolyzable silicon-containing group disclosed in JP-A-6-279693 can be also used.

The physical property adjustor may be used in an amount falling within the range of 0.1 to 20 parts by weight, and preferably 0.5 to 10 parts by weight based on 100 parts by weight of total amount of the organic polymer (A) and the organic polymer (C).

A thixotropic agent (anti-sagging agent) may be added to the curable composition of the present invention as needed in order to prevent sagging and to improve the workability. Although the anti-sagging agent is not particularly limited, for example, polyamide waxes; hydrogenated castor oil derivatives; metal soaps such as calcium stearate, aluminum stearate and barium stearate, and the like may be included. When rubber powders having a particle size of 10 to 500 μm as disclosed in JP-A-11-349916, or organic fibers as disclosed in JP-A-2003-155389 are used, compositions having high thixotropy and being favorable in workability may be obtained. These thixotropic agents (anti-sagging agents) may be used alone, or two or more thereof may be used in combination. The thixotropic agent may be used in an amount falling within the range of preferably 0.1 to 20 parts by weight based on 100 parts by weight of total amount of the organic polymer (A) and the organic polymer (C).

A compound including an epoxy group in one molecule may be added to the curable composition of the present invention as needed. When the compound including an epoxy group is used, the recovery property of the cured product can be improved. The compound including an epoxy group is not particularly limited, and examples thereof include e.g., epoxidized unsaturated fats and oils, epoxidized unsaturated fatty acid esters, alicyclic epoxy compounds, compounds typified by epichlorohydrin derivatives and mixtures thereof, and the like. Further, specific examples include epoxidized soybean oils, epoxidized linseed oils, bis(2-ethylhexyl)-4,5-epoxycyclohexane-1,2-dicarboxylate (E-PS), epoxyoctyl stearate, epoxybutyl stearate, and the like. Among these, E-PS is particularly preferred. The epoxy compound may be used in an amount falling within the range of 0.5 to 50 parts by weight based on 100 parts by weight of total amount of the organic polymer (A) and the organic polymer (C).

A photocurable substance may be added to the curable composition of the present invention as needed. When the photocurable substance is used, a coating film of the photocurable substance is formed on the surface of the cured product, whereby tack and weather resistance of the cured product can be improved. In the photocurable substance herein, a chemical change of the molecular structure is caused by an action of light within a fairly short period of time, thereby causing change in alteration of physical properties such as hardening. The photocurable substance is not particularly limited, and any known compound involving an organic monomer, an oligomer, a resin or a composition containing the same, for example, an unsaturated acrylic compound, a vinyl polycinnamate, an azidized resin, or the like can be used. As the unsaturated acrylic compound, monomers, oligomers or mixtures thereof having one to several acrylic or methacryl unsaturated groups, and monomers such as propylene (or butylene, ethylene)glycol di(meth)acrylate and neopentyl glycol di(meth)acrylate, and oligo esters having a molecular weight of no greater than 10,000 are exemplified. More specifically, illustrative examples include e.g., special acrylates (bifunctional), ARONIX M-210, ARONIX M-215, ARONIX M-220, ARONIX M-233, ARONIX M-240 and ARONIX M-245; special acrylates (trifunctional), ARONIX M-305, ARONIX M-309, ARONIX M-310, ARONIX M-315, ARONIX M-320 and ARONIX M-325; and special acrylates (polyfunctional), ARONIX M-400. Particularly, compounds having an acryl functional group are preferred, and compounds including the same three or more functional group on average per molecule are preferred. In the foregoing, ARONIX are all products manufactured by Toagosei Chemical Industry Co., Ltd.

Examples of the vinyl polycinnamates include photosensitive resins having a cinnamoyl group as a photosensitive group, which as esterified products of polyvinyl alcohol with cinnamic acid, as well as many vinyl polycinnamate derivatives. Azidized resins are known as photosensitive resins including an azido group as a photosensitive group, and in general, rubber photosensitive liquids including a photosensitizer added as a diazido compound, and those described in detail in "Photosensitive Resin" (published on Mar. 17, 1972, issued by Insatsu Gakkai Shuppanbu Ltd., page 93-, page 106-, page 117-) may be exemplified, which may be used alone or as a mixture, or with a sensitizer added as needed. When a sensitizer such as ketones and nitro compounds, and an accelerating agent such as amines are added, the effect may be improved. The photocurable substance may be used in the range of preferably 0.1 to 20 parts by weight, and more preferably 0.5 to 10 parts by weight based on total amount of the organic polymer (A) and the organic polymer (C). When the amount is no greater than 0.1 parts by weight, the effect of improving the weather resistance may not be exhibited, while when the amount is no less than 20 parts by weight, the cured product may be too hard, and cracks are likely to be generated.

An oxygen curable substance may be added to the curable composition of the present invention as needed. The oxygen curable substance refers to an unsaturated compound which can react with oxygen in the air, which forms a cured coating film in the vicinity of the surface of the cured product when it reacts with oxygen in the air, thereby capable of serving in preventing the tack of the surface, or the adhesion of dirt and dust to the surface of the cured product. The oxygen curable substance is not particularly limited, and examples thereof include e.g., drying oils typified by tung oil and linseed oil, and various types of alkyd resin obtained by modification of the compound; acrylic polymers modified by a drying oil, epoxy based resins, silicon resins; liquid polymers such as 1,2-polybutadiene, 1,4-polybutadiene and polymers of C5 to C8 diene obtained by polymerization or copolymerization of diene based compounds such as butadiene, chloroprene, isoprene and 1,3-pentadiene, and liquid copolymers such as NBR and SBR obtained by copolymerization of such a diene based compound with a monomer such as acrylonitrile or styrene that is copolymerizable with these diene based compounds at a ratio to provide the diene based compound as a principal component, as well as various types of modification products of the same (maleinated modification product, boiled oil modification product, etc.), and the like. These may be used alone, or two or more thereof may be used in combination. Of these, tung oil and liquid diene based polymers are particularly preferred. Furthermore, when a catalyst that accelerates an oxidative curing reaction or a metal dryer is used in combination, the effect may be improved. Examples of the catalyst and metal dryer include metal salts such as cobalt naphthenate, lead naphthenate, zirconium naphthenate, cobalt octylate and zirconium octylate, amine based compounds, and the like.

The amount of the oxygen curable substance used falls within the range of preferably 0.1 to 20 parts by weight, and more preferably 0.5 to 10 parts by weight based on 100 parts by weight of total amount of the organic polymer (A) and the organic polymer (C). When the amount is less than 0.1 parts by weight, improvement of pollution resistance may be insufficient, while the amount exceeding 20 parts by weight may result in tendency to deteriorate the tensile characteristics and the like of the cured product. As disclosed in JP-A-3-160053, the oxygen curable substance is preferably used in combination with the photocurable substance.

An antioxidant (antiaging agent) may be added to the curable composition of the present invention as needed. When the antioxidant is used, heat resistance of the cured product can be enhanced. The antioxidant is not particularly limited, and examples thereof include e.g., hindered phenolic, monophenolic, bisphenolic, polyphenolic antioxidants, and of these, hindered phenolic antioxidants are preferred. Similarly, hindered amine based light stabilizers presented as TINUVIN 622LD, TINUVIN 144, CHIMASSORB944LD and CHIMASSORB119FL (all in the foregoing manufactured by Ciba Specialty Chemicals Inc.); MARK LA-57, MARK LA-62, MARK LA-67, MARK LA-63 and MARK LA-68 (all in the foregoing manufactured by Asahi Denka Co., Ltd.); and SANOL LS-770, SANOL LS-765, SANOL LS-292, SANOL LS-2626, SANOL LS-1114 and SANOL LS-744 (all in the foregoing manufactured by Sankyo Co., Ltd. strain formula) can be also used. Specific examples of the antioxidant include those disclosed in JP-A-4-283259 and JP-A-9-194731. The amount of the antioxidant used falls within the range of preferably 0.1 to 10 parts by weight, and more preferably 0.2 to 5 parts by weight based on 100 parts by weight of total amount of the organic polymer (A) and the organic polymer (C).

A light stabilizer may be added to the curable composition of the present invention as needed. When the light stabilizer is used, photo-oxidative deterioration of the cured product can be prevented. Examples of the light stabilizer include benzotriazole based, hindered amine based, benzoate based compounds and the like, and the hindered amine based compounds are preferred among these. The amount of the light stabilizer used falls within the range of preferably 0.1 to 10 parts by weight, and more preferably 0.2 to 5 parts by weight based on 100 parts by weight of total amount of the organic polymer (A) and the organic polymer (C). Specific examples of the light stabilizer are disclosed also in JP-A-9-194731.

When the light stabilizer and the photocurable substance are used in combination in the curable composition of the present invention, particularly when an unsaturated acrylic compound is added as the photocurable substance, to use a tertiary amine-containing hindered amine based light stabilizer as the hindered amine based light stabilizer is preferred for improving the storage stability of the composition, as disclosed in JP-A-5-70531. As the tertiary amine-containing hindered amine based light stabilizer, light stabilizers such as TINUVIN 622LD and TINUVIN 144, CHIMASSORB119FL (all in the foregoing manufactured by Ciba Specialty Chemicals Inc.); MARK LA-57, LA-62, LA-67 and LA-63 (all in the foregoing manufactured by Asahi Denka Co., Ltd.); and SANOL LS-765, LS-292, LS-2626, LS-1114 and LS-744 (all in the foregoing Sankyo Co., Ltd.) may be exemplified.

An ultraviolet absorber may be added to the curable composition of the present invention as needed. When the ultraviolet absorber is used, the surface weather resistance of the cured product can be improved. The ultraviolet absorber is not particularly limited, and examples thereof include e.g., benzophenone based, benzotriazole based, salicylate based, substituted tolyl based and metal chelate based compounds and the like, and benzotriazole based compounds are preferred. The amount of the ultraviolet absorber used falls within the range of preferably 0.1 to 10 parts by weight, and more preferably 0.2 to 5 parts by weight based on 100 parts by weight of total amount of the organic polymer (A) and the organic polymer (C). Also, it is preferred that the phenolic or hindered phenolic antioxidant and the hindered amine based light stabilizer, and the benzotriazole based ultraviolet absorber be used in combination.

An epoxy resin can be added to the curable composition of the present invention as needed. The composition to which the epoxy resin was added is particularly preferred as an adhesive, and in particular, as an adhesive for tiles of outer walls. The epoxy resin is not particularly limited, and examples thereof include e.g., epichlorohydrin-bisphenol A type epoxy resins, epichlorohydrin-bisphenol F type epoxy resins, flame retardant epoxy resins such as glycidyl ether of tetrabromobisphenol A, novolak type epoxy resins, hydrogenated bisphenol A type epoxy resins, glycidyl ether type epoxy resins of bisphenol A propylene oxide adducts, p-oxybenzoic acid glycidyl ether ester type epoxy resins, m-aminophenolic epoxy resins, diaminodiphenylmethane based epoxy resins, urethane-modified epoxy resins, various types of alicyclicepoxy resins, glycidyl ethers of a polyhydric alcohol such as N,N-diglycidylaniline, N,N-diglycidyl-o-toluidine, triglycidylisocyanurate, polyalkylene glycol diglycidyl ether and glycerin, hydantoin type epoxy resins, epoxidized products of unsaturated polymers such as petroleum resins, and the like. Of these, those including at least two epoxy groups in a molecule are more preferred in light of high reactivity in curing, and ease in formation of three-dimensional network of the cured product, and bisphenol A type epoxy resins, novolak type epoxy resins, and the like are particularly preferred. The weight ratio of the aforementioned epoxy resin to the total amount of the organic polymer (A) and the organic polymer (C), ((A)+(C))/epoxy resin falls within the range of 100/1 to 1/100. When the ratio ((A)+(C))/epoxy resin is less than 1/100, the effect of improving the impact strength or the toughness of the cured product of the epoxy resin may be hardly achieved. When the ratio ((A)+(C))/epoxy resin exceeds 100/1, the strength of the organic based polymer-cured product may be insufficient. Although preferable ratio cannot be categorically determined since it may vary depending on the application and the like of the curable composition, for example, when improvement of the impact resistance, flexibility, toughness, peel strength and the like of the cured product of the epoxy resin is intended, preferably 1 to 100 parts by weight, and more preferably 5 to 100 parts of the total amount of the organic polymer (A) and the organic polymer (C) based on 100 parts by weight of the epoxy resin may be used. On the other hand, when improvement of the strength of the cured product is intended, the epoxy resin may be used in an amount of preferably 1 to 200 parts by weight, and more preferably 5 to 100 parts by weight based on 100 parts by weight of total amount of the organic polymer (A) and the organic polymer (C).

The epoxy resin, and a curing agent that allows the epoxy resin to be hardened can be added in combination into the curable composition of the present invention. The curing agent for the epoxy resin is not particularly limited, and any known curing agent for epoxy resins can be used. Examples thereof include compounds e.g., primary and secondary amines such as triethylenetetramine, tetraethylenepentamine, diethylaminopropylamine, N-aminoethylpiperidine, m-xylylenediamine, m-phenylenediamine, diaminodiphenylmethane, diaminodiphenyl sulfone, isophoronediamine and amine terminated polyether; tertiary amines such as 2,4,6-tris(dimethylamino methyl)phenol and tripropylamine, and these salts of these tertiary amines; polyamide resins; imidazoles; dicyanogendiamides; boron trifluoride complex compounds; carboxylic anhydrides such as phthalic anhydride, hexahydrophthalic anhydride, tetrahydrophthalic anhydride, dodecynylsuccinic anhydride, pyromellitic anhydride and chlorendic anhydride; alcohols; phenols; carboxylic acids; diketone complex compounds of aluminum or zirconium, and the like. Also, the curing agent may be used alone, or two or more thereof may be used in combination.

When the curing agent for the epoxy resin is used, the amount of the same used preferably falls within the range of 0.1 to 300 parts by weight based on 100 parts by weight of the epoxy resin.

Alternatively, ketimine can be used as the curing agent for the epoxy resin. Ketimine is characteristic in that it is stably present under conditions not including moisture, but is decomposed into primary amine and ketone upon coming into contact with the moisture, and thus generated primary amine serves as a curing agent that is curable at room temperatures of the epoxy resin. Thus, when ketimine is used, a one pack type composition can be obtained. Such ketimine can be obtained by a condensation reaction of an amine based compound and a carbonyl compound.

The amine based compounds and carbonyl compounds for use in synthesizing ketimine are not particularly limited, and known compounds may be used. Examples of the amine based compound include e.g., diamines such as ethylenediamine, propylenediamine, trimethylenediamine, tetramethylenediamine, 1,3-diaminobutane, 2,3-diaminobutane, pentamethylenediamine, 2,4-diaminopentane, hexamethylenediamine, p-phenylenediamine and p,p'-biphenylenediamine; polyvalent amines such as 1,2,3-triaminopropane, triaminobenzene, tris(2-aminoethyl)amine and tetrakis(aminomethyl)methane; polyalkylene based polyamines such as diethylenetriamine, triethylenetriamine and tetraethylenepentamine; polyoxyalkylene based polyamines; aminosilanes such as γ-aminopropyltriethoxysilane, N-(β-aminoethyl)-γ-aminopropyltrimethoxysilane and N-(β-aminoethyl)-γ-aminopropylmethyldimethoxysilane; and the like. Also, examples of the carbonyl compound include aldehydes such as acetaldehyde, propionaldehyde, n-butylaldehyde, isobutyl aldehyde, diethyl acetaldehyde, glyoxal and benzaldehyde; cyclic ketones such as cyclopentanone, trimethylcyclopentanone, cyclohexanone and trimethylcyclohexanone; aliphatic ketones such as acetone, methylethyl ketone, methylpropyl ketone, methylisopropyl ketone, methylisobutyl ketone, diethyl ketone, dipropyl ketone, diisopropyl ketone, dibutyl ketone and diisobutyl ketone; β-dicarbonyl compounds such as acetyl acetone, methyl acetoacetate, ethyl acetoacetate, dimethyl malonate, diethyl malonate, methylethyl malonate, dibenzoylmethane; and the like.

When an imino group is present in the ketimine, the imino group may be allowed to react with: styrene oxide; a glycidyl ether such as butylglycidyl ether or allylglycidyl ether; a glycidyl ester or the like. These ketimines may be used alone, or two or thereof may be used in combination. The ketimine may be used in an amount of 1 to 100 parts by weight based on 100 parts by weight of the epoxy resin, and its amount varies in accordance with the types of the epoxy resin and ketimine.

To the curable composition of the present invention may be added a phosphorus based plasticizer such as ammonium polyphosphate or tricresyl phosphate, a fire retardant such as aluminum hydroxide, magnesium hydroxide, or thermally expandable graphite. The aforementioned fire retardant may be used alone, or two or more thereof may be used in combination.

The fire retardant may be used in an amount falling within the range of 5 to 200 parts by weight, and preferably 10 to 100 parts by weight based on 100 parts by weight of total amount of the organic polymer (A) and the organic polymer (C).

For the purpose of adjusting various physical properties of the curable composition or the cured product, various types of additives may be added as needed to the curable composition of the present invention. Examples of such additives include e.g., curability adjusting agents, radical inhibitors, metal inactivators, ozone antidegradants, phosphorus based peroxide decomposers, lubricants, pigments, foaming agents, repellents for ants, mildew proofing agents, and the like. These various types of additives may be used alone, or two or more thereof may be used in combination. Specific examples of the additives other than those herein referred to are disclosed in each publication such as e.g., JP-B-4-69659, JP-B-7-108928, JP-A-63-254149, JP-A-64-22904, and JP-A-2001-72854.

The curable composition of the present invention can be prepared as a one component system by compounding all the components to be blended followed by air-tightly sealing to store beforehand, which is cured by moisture in the air after the coating. Alternatively, it can be prepared as a two-component system by separately compounding components such as the during catalyst, filler, plasticizer, water and the like as a curing agent, and mixing the blended materials with a polymer composition in use. In light of the workability, the one component system is preferred.

When the curable composition is prepared as a one component system, all components to be blended are compounded beforehand, therefore, the components to be blended which contain moisture are preferably used after they are dehydrated and dried beforehand, or dehydrated by reduced pressure or the like during the compounding/kneading. When the curable composition is prepared as a two-component system, it is not necessary to blend a curing catalyst to the base component that contains the polymer having a reactive silicon group. Therefore, less concern about gelation is necessary even though moisture is included to a slight extent in the blend, but it would be preferred to subject to dehydration and drying when storage stability for a long term is required. Suitable dehydrating and drying method may be a heat drying in the case of solids such as powders, while a vacuum dehydration or a dehydration using synthetic zeolite, active alumina, silica gel, quick lime, magnesium oxide or the like is suitable in the case of liquids. Alternatively, dehydration may be also permitted by blending a small amount of an isocyanate compound thereby allowing the isocyanate group to react with water. Also, dehydration may be carried out by blending an oxazolidine compound such as 3-ethyl-2-methyl-2-(3-methylbutyl)-1,3-oxazolidine to permit reaction with water. In addition to such a dehydration and drying method, storage stability can be further improved by adding lower alcohol such as methanol or ethanol; or an alkoxysilane compound such as n-propyltrimethoxysilane, vinyltrimethoxysilane, vinylmethyldimethoxysilane, methylsilicate, ethylsilicate, γ-mercaptopropylmethyldimethoxysilane, γ-mercaptopropylmethyldiethoxysilane or γ-glycidoxypropyltrimethoxysilane.

The amount of the silicon compound used which can react with water such as a dehydrating agent, particularly vinyltrimethoxysilane falls within the range of preferably 0.1 to 20 parts by weight, and more preferably 0.5 to 10 parts by weight based on 100 parts by weight of total amount of the organic polymer (A) and the organic polymer (C).

The preparation method of the curable composition of the present invention is not particularly limited, and common methods such as for example, those including: compounding the aforementioned components; and kneading by means of a mixer, a roll or a kneader at an ordinary temperature or under heating, or dissolving the components using a small quantity of a suitable solvent to execute mixing may be employed.

The curable composition of the present invention forms a three-dimensional network organization by the action of moisture upon exposure to the ambient air, thereby being hardened into a solid having rubbery elasticity.

The curable composition of the present invention can be used for: binders; sealants for use in buildings, marine vessels, automobiles and roadways; adhesives, profiling agents, vibration isolators, damping materials, soundproof materials, foaming materials, paints, spraying materials, and the like. Since the cured product obtained by hardening the curable composition of the present invention is superior in the flexibility and adhesiveness, it is more preferred to be used as a sealant or an adhesive among the applications as described above.

In addition, the curable composition of the present invention can be used in a variety of applications such as: electrical and electronic parts materials such as sealants for solar cell back faces; electrical insulating materials such as insulating coating materials for electric wires and cables; elastic adhesives; contact type adhesives; spray type sealing material; crack repairing materials; adhesives for tiling; powdery paints; casting materials; medical rubber materials; medical agglutinants; medical equipment sealing materials; food packaging material; sealants for joints of sheathing materials such as siding boards; coating materials; primer; conductive materials for electromagnetic wave shielding; thermally conductive materials; hot melt materials; potting agents for electrical and electronic applications; films; gaskets; various types of molding materials; as well as sealants for rust prevention and waterproofing of wired sheet glass and shatterproof glass end faces (cut sections); and liquid sealing agents used for automobile parts, electric parts and various types of mechanical parts; and the like. Moreover, since the curable composition of the present invention can cohesively adhere to a wide variety of substrates such as glasses, porcelains, woods, metals, resin molded products and the like, it can be also used as a variety of type of cohesive compositions and adhesive compositions alone, or with the aid of a primer. Furthermore, the curable composition of the present invention can be also used as adhesives for interior panels, adhesives for exterior panels, adhesives for tiling, adhesives for installing stone veneers, adhesives for finishing of ceilings, adhesive for finishing of floors, adhesives for finishing walls, adhesives for vehicle panels, adhesives for assembly of electrical and electronic precision equipments, sealants for direct grazing, sealants for multi-layer glasses, sealants for SSG construction methods, or sealants for working joints of architectures.

EXAMPLES

Hereinafter, the present invention is explained in more detail by way of Examples, but the present invention is not any how limited thereto.

Synthesis Example 1

Using polyoxypropylenediol having a molecular weight of about 2,000 as an initiator, polymerization of propylene oxide was carried out with a zinc hexacyano cobaltate glyme complex catalyst to obtain polypropylene oxide having a terminal hydroxyl group and having a number average molecular weight of 25,500 (in terms of the polystyrene equivalent molecular weight determined using: HLC-8120GPC manufactured by Tosoh Corporation as the liquid feeding system;

TSK-GEL H type manufactured by Tosoh Corporation as the column; and THF as the solvent). Subsequently, a methanol solution of 1.2 times equivalent of NaOMe based on the hydroxyl group of this hydroxyl-terminated polypropylene oxide was added thereto, and methanol was distilled off. Further, allyl chloride was added thereto to convert the terminal hydroxyl group into an allyl group. The unreacted allyl chloride was removed by devolatilization under reduced pressure. After 300 parts by weight of n-hexane and 300 parts by weight of water were added to 100 parts by weight of thus resulting unpurified allyl-terminated polypropylene oxide while stirring, water was removed by centrifugal separation, and 300 parts by weight of water was added to the resulting hexane solution while stirring. After water was removed again by centrifugal separation, hexane was removed by devolatilization under reduced pressure. Thus, an allyl-terminated bifunctional polypropylene oxide having a number average molecular weight of about 25,500 (P-1) was obtained.

Using 10 parts by weight of toluene and a 2-propanol solution of platinic chloride having a platinum content of 3% by weight as a catalyst in an amount of 800 ppm based on the amount of the polymer, 0.9 parts by weight of dimethylchlorosilane was allowed to react with 100 parts by weight of the polymer (P-1) at 90° C. for 2 hrs. Toluene was removed by devolatilization in vacuo, whereby dimethylchlorosilyl-terminated polypropylene oxide (C-1) was obtained. The number of the terminal dimethylchlorosilyl group determined from the integration value of the spectrum obtained with $^1$H-NMR measurement (measured in a $CDCl_3$ solvent using AMX400 manufactured by BRUKER Co., Ltd.) was about 1.3 on average per molecule.

To 100 parts by weight of the polymer (C-1) was added 250 parts by weight of tetrahydrofuran (THF). Thereto was added 17 parts by weight of a saturated aqueous sodium bicarbonate solution dropwise, and the mixture was stirred at room temperature for 15 min. Water was added to this solution, and separated into the organic layer and the aqueous layer, followed by removing the aqueous layer. Furthermore, azeotropic dehydration was allowed using toluene, whereby silanol-terminated polypropylene oxide (C-2) was obtained. Conversion into silanol was confirmed by the $^1$H-NMR measurement.

To 100 parts by weight of the polymer (C-2) were added 8.1 parts by weight of chloromethyltrimethoxysilane and 1 part by weight of triethylamine (TEA), and the mixture was stirred at 90° C. for 14 hrs. Subsequently, unreacted chloromethyltrimethoxysilane and TEA were removed by devolatilization in vacuo at 90° C., whereby a chloromethyldimethoxysilyl-terminated polypropylene oxide (A-1) was obtained. The number of the terminal chloromethyldimethoxysilyl group determined from the integration value of the spectrum obtained with $^1$H-NMR measurement was about 1.3 on average per molecule.

Comparative Synthesis Example 1

Using a 150 ppm 2-propanol solution of a platinum vinyl siloxane complex having a platinum content of 3% by weight as a catalyst, 0.9 parts by weight of methyldimethoxysilane was allowed to react at 90° C. for 5 hrs with 100 parts by weight of the allyl-terminated polypropylene oxide (P-1) synthesized in Synthesis Example 1, whereby a methyldimethoxysilyl-terminated polyoxypropylene based polymer (C-3) was obtained. The number of the terminal methyldimethoxysilyl group determined from the integration value of the spectrum obtained with $^1$H-NMR measurement (measured in a $CDCl_3$ solvent using JNM-LA400 manufactured by JEOL, Ltd.) was about 1.3 on average per molecule.

Comparative Synthesis Example 2

Using a 150 ppm 2-propanol solution of a platinum vinyl siloxane complex having a platinum content of 3% by weight as a catalyst, 1.1 parts by weight of trimethoxysilane was allowed to react at 90° C. for 2 hrs with 100 parts by weight of the allyl-terminated polypropylene oxide (P-1) synthesized in Synthesis Example 1, whereby a trimethoxysilyl-terminated polyoxypropylene based polymer (C-4) was obtained. The number of the terminal trimethoxysilyl group determined from the integration value of the spectrum obtained with $^1$H-NMR measurement (measured in a $CDCl_3$ solvent using JNM-LA400 manufactured by JEOL, Ltd.) was about 1.3 on average per molecule.

Comparative Synthesis Example 3

Using polyoxypropylenediol having a molecular weight of about 2,000 as an initiator, a hydroxyl-terminated polypropylene oxide having a number average molecular weight of about 14,500 was obtained similarly to Synthesis Example 1. Subsequently, in a similar manner to Synthesis Example 1, allyl-terminated bifunctional polypropylene oxide having a number average molecular weight of about 14,500 (P-2) was obtained.

Dimethylchlorosilane in an amount of 2.1 parts by weight was allowed to react at 90° C. for 2 hrs with 100 parts by weight of the polymer (P-2) using 10 parts by weight of toluene, and a 2-propanol solution of platinic chloride having a platinum content of 3% by weight as a catalyst in an amount of 500 ppm based on the amount of the polymer. Toluene was removed by devolatilization in vacuo, whereby dimethylchlorosilyl-terminated polypropylene oxide (C-5) was obtained. The number of the terminal dimethylchlorosilyl group determined with $^1$H-NMR measurement was about 1.6 on average per molecule.

To 100 parts by weight of the polymer (C-5) was added 75 parts by weight of tetrahydrofuran (THF). Thereto was added 34 parts by weight of a saturated aqueous sodium bicarbonate solution dropwise, and the mixture was stirred at room temperature for 15 min. Water was added to this solution, and separated into the organic layer and the aqueous layer, followed by removing the aqueous layer. Furthermore, azeotropic dehydration was allowed using toluene, whereby silanol-terminated polypropylene oxide (C-6) was obtained. Conversion into silanol was confirmed by the $^1$H-NMR measurement.

To 100 parts by weight of the silanol-terminated polypropylene oxide (C-6) were added 12 parts by weight of methyltrimethoxysilane and 1 part by weight of 1,8-diazabicyclo (5,4,0)undecene-7 (DBU), and the mixture was stirred at room temperature for about 1.5 hrs. Subsequently, unreacted methyltrimethoxysilane and DBU were removed by devolatilization in vacuo at 100° C., whereby a dimethoxymethylsilyl-terminated polypropylene oxide (C-7) was obtained. Introduction of the dimethoxymethylsilyl group to the end was confirmed by $^1$H-NMR measurement. The number of the terminal dimethoxymethylsilyloxy group determined from the integration value of the spectrum obtained with $^1$H-NMR measurement was about 1.6 on average per molecule.

Examples 1 and 2, Comparative Examples 1 to 6

Using the organic polymers (A-1), (C-3), (C-4), and (C-7), curability was determined according to the compositions shown in Table 1. The curing catalyst was added to the organic polymer which had been weighed into a mini cup, and the mixture was kneaded/stirred using a spatula for 30 sec, which was then left to stand still under a condition at a constant temperature and humidity of 25° C. and 50%. The time point of this operation was regarded as curing start time. The tip of the spatula was brought into contact with the surface of the mixture every 1 min within initial 5 min, every 5 min within the following 1 hour, and every 30 min thereafter. Accordingly, the time at which adhesion of the mixture to the spatula failed was determined as a skin formation time.

The results are shown in Table 1.

Comparative Synthesis Example 4

Using a 150 ppm 2-propanol solution of a platinum vinyl siloxane complex having a platinum content of 3% by weight as a catalyst, 1.8 parts by weight of methyldimethoxysilane was allowed to react at 90° C. for 5 hrs with 100 parts by weight of the allyl-terminated polypropylene oxide (P-2) synthesized in a similar manner to Comparative Synthesis Example 3, whereby a methyldimethoxysilyl-terminated polyoxypropylene based polymer (C-8) was obtained. The number of the terminal methyldimethoxysilyl group determined with $^1$H-NMR measurement (measured in a CDCl$_3$

TABLE 1

| Composition (parts by weight) | | Example | | Comparative Example | | | | | |
|---|---|---|---|---|---|---|---|---|---|
| | | 1 | 2 | 1 | 2 | 3 | 4 | 5 | 6 |
| Organic polymer (A) | A-1 | 100 | 100 | | | | | | |
| Organic polymer (C) | C-3 | | | 100 | 100 | | | | |
| | C-4 | | | | | 100 | 100 | | |
| | C-7 | | | | | | | 100 | 100 |
| Curing catalyst (B) | DBU (1) | 2 | | 2 | | 2 | | 2 | |
| | DEAPA (2) | | 2 | | 2 | | 2 | | 2 |
| Curability | Skin formation time | 1 min | 15 min | =24 hrs | =24 hrs | 35 min | =24 hrs | 230 min | =4 hrs |

(1) 1,8-diazabicyclo[5,4,0]undecane-7 (manufactured by Wako Pure Chemical Industries, Ltd.)
(2) 3-diethylaminopropylamine (manufactured by Wako Pure Chemical Industries, Ltd.)

As is clear from Table 1, the curable composition prepared with the organic polymer (A-1) exhibited more rapid curability as compared with the curable composition prepared with the organic polymer (C-3), (C-4) or (C-7).

Synthesis Example 2

To the polymer (C-6) in an amount of 100 parts by weight synthesized in a similar manner to Comparative Synthesis Example 3 was added 4.5 parts by weight of diethylaminomethyltriethoxysilane, and the mixture was stirred at room temperature for 1 hour, whereby a diethylaminomethyldiethoxysilyl-terminated polypropylene oxide (A-2) was obtained. The number of the terminal diethylaminomethyldiethoxysilyl group determined with $^1$H-NMR measurement was about 1.6 on average per molecule.

solvent using JNM-LA400 manufactured by JEOL, Ltd.) was about 1.6 on average per molecule.

Examples 3 to 5, Comparative Examples 7 to 10

Using the organic polymers (A-2), (C-7), and (C-8), curability was determined according to the compositions shown in Table 2. In a similar manner to the method described above, the skin formation time was determined.

The results are shown in Table 2.

TABLE 2

| Composition (parts by weight) | | Example | | | Comparative Example | | | |
|---|---|---|---|---|---|---|---|---|
| | | 3 | 4 | 5 | 7 | 8 | 9 | 10 |
| Organic polymer (A) | A-2 | 100 | 100 | 100 | | | | |
| Organic polymer (C) | C-7 | | | | | | | 100 |
| | C-8 | | | | 100 | 100 | 100 | |
| Curing catalyst (B) | DBU (1) | 2 | | | 2 | | | |
| | Versatic 10 (2) | | 2 | 1.6 | | 2 | 1.6 | 1.6 |
| | DEAPA (3) | | | 0.4 | | | 0.4 | 0.4 |
| Curability | Skin formation time | 15 min | 1 min | 1 min | =24 hrs | =24 hrs | 45 min | 220 min |

(1) 1,8-diazabicyclo[5,4,0]undecane-7 (manufactured by Wako Pure Chemical Industries, Ltd.)
(2) neodecanoic acid, (manufactured by Japan Epoxy Resins Co., Ltd.)
(3) 3-diethylaminopropylamine (manufactured by Wako Pure Chemical Industries, Ltd.)

As is clear from Table 2, the curable composition prepared with the organic polymer (A-2) exhibited more rapid curability as compared with the curable composition prepared with the organic polymer (C-7), or (C-8).

Comparative Synthesis Example 5

Dimethoxymethylsilane in an amount of 1.8 parts by weight was allowed to react with 100 parts by weight of the aforementioned allyl-terminated polyoxypropylene (P-2) using a 150 ppm isopropyl alcohol solution of a platinum vinyl siloxane complex having a platinum content of 3% by weight as a catalyst at 90° C. for 2 hrs. Subsequently, the reaction mixture was subjected to devolatilization in vacuo using a vacuum pump at 90° C. for 2 hrs. A peak showing introduction of the methyldimethoxysilyl group was observed according to the measurement by $^1$H-NMR (analyzed using Avance III 400 MHz NMR system manufactured by BRUKER Co., Ltd., in a CDCl$_3$ solvent, with assuming the peak for CHCl$_3$ found at 7.26 ppm) along with the disappearance of the peak for the allyl group, whereby production of a methyldimethoxysilyl-terminated polyoxypropylene based polymer (C-9) was ascertained.

In the $^1$H-NMR spectrum, the integration value for the CH$_3$ peak in the main chain of the polymer (P-2) was designated as S-P2, while the integration value for the terminal CH$_2$ peak of the allyl group was designated as M-P2. The integration value for the CH$_3$ peak in the main chain of the polymer (C-9) was designated as S-C9, and the integration value for the SiCH$_2$ peak was designated as M-C9. The rate of introduction (Fn) of the methyldimethoxysilyl group was calculated according to the following formula:

$$Fn=(M\text{-}C9/S\text{-}C9)/(M\text{-}P2/S\text{-}P2)\times100(\%),$$

and thus Fn of 80% was revealed. This revealed that the polymer (C-9) includes 1.6 methyldimethoxysilyl groups on average per molecule.

Synthesis Example 3

Chloromethyldichlorosilane in an amount of 2.7 parts by weight synthesized by allowing trichlorosilane and diazomethane to react according to the experiment conditions described in INORGANIC SYNTHESES., 6, 37 (1960) was allowed to react with 100 parts by weight of the aforementioned allyl-terminated polyoxypropylene (P-2) using a 500 ppm isopropyl alcohol solution of platinic chloride having a platinum content of 3% by weight as a catalyst at 90° C. for 2 hrs. Subsequently, the reaction mixture was subjected to devolatilization in vacuo using a vacuum pump at 90° C. for 2 hrs. A peak showing introduction of the chloromethyldichlorosilyl group was observed at 2.79 ppm was observed along with the disappearance of the peak for the allyl group according to the measurement by $^1$H-NMR. Thus, it was confirmed that a chloromethyldichlorosilyl-terminated polyoxypropylene based polymer (A-3) was obtained.

Synthesis Example 4

Next, 10 parts by weight of trimethyl orthoformate was added to 100 parts by weight of the organic polymer (A-3), and 3.2 parts by weight of dehydrated methanol was added dropwise at 70° C. The reaction mixture was stirred for 20 min, and change of the reaction mixture from acidic to neutral was proven with a pH test paper. Again, the mixture was subjected to devolatilization in vacuo at 90° C. for 2 hrs. A peak for SiCH$_2$Cl (2.82 ppm), a peak for Si(OCH$_3$)$_2$ (3.59 ppm), and a peak for SiCH$_2$CH$_2$ (0.80, 1.68 ppm) were observed according to the measurement by $^1$H-NMR, whereby production of a chloromethyldimethoxysilyl-terminated polyoxypropylene based polymer (A-4) was ascertained. In the $^1$H-NMR spectrum, the integration value for the CH$_3$ peak in the main chain of the polymer (A-4) was designated as S-A4; the integration value for the SiCH$_2$Cl peak was designated as M-A4; the integration value for the CH$_3$ peak in the main chain of the polymer (P-2) was designated as S-P2; and the integration value for the terminal CH$_2$ peak of the allyl group was designated as M-P2. The rate of introduction (Fn) of the chloromethyldimethoxysilyl group was calculated according to the following formula:

$$Fn=(M\text{-}A4/S\text{-}A4)/(M\text{-}P2/S\text{-}P2)\times100(\%),$$

and thus Fn of 80% was revealed. This proven that the polymer (A-4) includes 1.6 chloromethyldimethoxysilyl groups on average per molecule.

Synthesis Example 5

Into a reaction vessel 0.3 g of tetrabutylammonium chloride (manufactured by Wako Pure Chemical Industries, Ltd.) was weighed, and a dry nitrogen atmosphere was brought into the reaction vessel. Next, 18.4 g of chloromethyltrichlorosilane (LS-30, manufactured by Shin-Etsu Chemical Co.), and 13.6 g of dimethylphenylsilane (LS-2010, manufactured by Shin-Etsu Chemical Co.) were charged into the reaction vessel. The reaction mixture was heated to 90° C. while stirring well, whereby the reaction was allowed for 2 hrs. A reaction mixture was obtained including chloromethyldichlorosilane and chlorodimethylphenylsilane (C$_6$H$_5$(CH$_3$)$_2$SiCl) as principal components as verified by $^1$H-NMR measurement. First, the reaction mixture was subjected to devolatilization at 40° C. using an evaporator, and thus a component having a low boiling point was recovered. Accordingly, chlorodimethylphenylsilane and ammonium salts were removed. Next, the component having a low boiling point was charged into the reaction vessel again, and a nitrogen atmosphere was brought therein. To the reaction vessel were added 100 ml of dehydrated diethyl ether (manufactured by Wako Pure Chemical Industries, Ltd.), and 10 g of trimethyl orthoformate (manufactured by Wako Pure Chemical Industries, Ltd.) at 23° C. Then, 3 g of dehydrated methanol (manufactured by SIGMA-ALDRICH Japan K.K.) was added dropwise slowly while stirring. After the mixture was stirred for 30 min, $^1$H-NMR measurement verified that the component having a low boiling point, Si—Cl, was quantitatively converted into Si—OCH$_3$. The product included chloromethyldimethoxysilane as a principal component. The reaction mixture was subjected to simplified distillation using a column provided by filling McMahon packing in a fractionating column having a diameter of 2 cm and a length of 20 cm, and thus a mixture of chloromethyldimethoxysilane and chloromethyltrimethoxysilane (molar ratio being 77:23) was obtained in the high-boiling fraction. The product was identified by means of $^1$H-NMR spectrum, revealing attribution of chloromethyldimethoxysilane (2H: 2.83 ppm (doublet), 6H: 3.63 ppm, 1H: 4.53 ppm (triplet)), and chloromethyltrimethoxysilane (2H: 2.82 ppm, 9H: 3.64 ppm).

The mixture of chloromethyldimethoxysilane and chloromethyltrimethoxysilane obtained as described above in an amount of 4.3 parts by weight was allowed to react with 100 parts by weight of the aforementioned allyl-terminated polyoxypropylene (P-2) using a 200 ppm isopropyl alcohol solution of a platinum vinyl siloxane complex having a platinum content of 3% by weight as a catalyst at 90° C. for 2 hrs. Subsequently, the reaction mixture was subjected to devolatilization in vacuo using a vacuum pump at 90° C. for 2 hrs. A peak showing introduction of the chloromethyldimethoxysilyl group was observed according to the measurement by $^1$H-NMR along with the disappearance of the peak for the allyl group, whereby production of a chloromethyldimethoxysilyl-terminated polyoxypropylene based polymer (A-5) was ascertained.

In the $^1$H-NMR spectrum, the integration value for the CH$_3$ peak in the main chain of the polymer (A-5) was designated as S-A5, while the integration value for the SiCH$_2$Cl peak was designated as M-A5. The rate of introduction (Fn) of the chloromethyldimethoxysilyl group was calculated according to the following formula:

$$Fn=(M\text{-}A5/S\text{-}A5)/(M\text{-}P2/S\text{-}P2)\times 100(\%),$$

and thus Fn of 80% was revealed. This proven that the polymer (A-5) includes 1.6 chloromethyldimethoxysilyl groups on average per molecule.

Examples 6 to 11, Comparative Examples 10 to 13

The reactive silicon group-containing organic polymer was evaluated on the curability according to the method described below.

As shown in Table 3, the polymer (A-4) or the polymer (C-9) was weighed into a mini cup, to which an organic tin compound and an amine based compound were added as the curing catalyst (B), and the mixture was kneaded well with a spatula for 1 min. After kneading, the cup was left to stand still in a chamber kept at constant temperature and humidity, at 23° C. and 50%, and the time point of this operation was regarded as curing start time. The tip of the spatula was brought into contact with the surface every 1 min within initial 10 min, every 10 min within the following 2 hrs, and every 1 hour thereafter. Accordingly, the time at which adhesion of the composition to the spatula failed was determined as a skin formation time, whereby the curing time was derived. When the surface was not hardened even after 24 hrs, the subjected was evaluated as "uncured". The results are shown in Table 3.

With all curing catalysts shown in Table, shorter skin formation time was verified on the polymer (A-4) as compared with the polymer (C-9). In particular, the effect was prominent in the case in which the amine based compound was used.

What is claimed is:

1. An organic polymer (A) having a number average molecular weight of 3,000 to 100,000, and comprising a crosslinkable silicon-containing organic group represented by the general formula (1):

(wherein, $R^1$ that is present in the number of "a" each independently represents an organic group represented by the general formula (2); $R^2$ that is present in the number of "b" each independently represents a hydrocarbon group having 1 to 20 carbon atoms, or a triorganosiloxy group represented by the formula of: $(R')_3$SiO— (wherein, R' each independently represents a hydrocarbon group having 1 to 20 carbon atoms); X that is present in the number of "c" each independently represents a hydrolyzable group or a hydroxyl group; a is 1 or 2; b is 0 or 1; c is 1 or 2; and the relationship of: a+b+c=3 is satisfied) in the number of one or more on average per molecule

(wherein, Y that is present in the number of "d" each independently represents an electron-withdrawing group; $R^3$ that is present in the number of (3-d) each independently represents a hydrogen atom or an alkyl group having 1 to 19 carbon atoms; and d is any one of 1, 2 or 3), and the electron-withdrawing group included in the organic groups represented by the general formulae (2) is an alkoxy group; and

TABLE 3

| Composition (parts by weight) | | Example | | | | | | Comparative Example | | | |
|---|---|---|---|---|---|---|---|---|---|---|---|
| | | 6 | 7 | 8 | 9 | 10 | 11 | 10 | 11 | 12 | 13 |
| Organic polymer (A) | A-4 | 100 | 100 | 100 | 100 | 100 | 100 | | | | |
| Organic polymer (C) | C-9 | | | | | | | 100 | 100 | 100 | 100 |
| Organic tin compound | Neostann U220H$^{(1)}$ | 2 | | | | | | 2 | | | |
| Amine based compound | DBU$^{(2)}$ | | 0.7 | | | | | | 0.7 | | |
| | Phenylguanidine$^{(3)}$ | | | 2 | | | | | | | |
| | Ortho-tolylbiguanide$^{(4)}$ | | | | 2 | | | | | | |
| | DEAPA$^{(5)}$ | | | | | 2 | | | | 2 | |
| | A1110$^{(6)}$ | | | | | | 2 | | | | 2 |
| Curability | Skin formation time | 1 min | 1 min | 3 min | 8 min | 40 min | 100 min | 10 min | uncured | uncured | uncured |

$^{(1)}$Nitto Kasei Co., Ltd.: dibutyltin bisacetylacetonato $^{(2)}$Wako Pure Chemical Industries, Ltd.: 1,8-diazabicyclo[5,4,0]undecene-7

$^{(3)}$Nippon Carbide Industries Co., $^{(4)}$ALDRICH Japan K.K.

$^{(5)}$Wako Pure Chemical Industries, Ltd.: 3-diethylaminopropylamine $^{(6)}$Dow Corning Toray Co., Ltd.: 3-aminopropyltrimethoxysilane wherein the hydrolysable group X is selected from the group consisting of a hydrogen atom, a halogen atom, an alkoxy group, an aryloxy group, an acyloxy group, a ketoximate group, an amino group, an amide group, an acid amide group, an aminooxy group, a mercapto group, and an alkenyloxy group.

2. The organic polymer according to claim 1, wherein the main chain skeleton of the organic polymer (A) has at least one selected from the group consisting of a polyoxyalkylene polymer, a saturated hydrocarbon polymer, and a (meth) acrylic ester polymer.

3. The organic polymer according to claim 1, wherein the main chain skeleton of the organic polymer (A) is polypropylene oxide.

4. A method for producing the organic polymer (A) according to claim 2 which comprises allowing an organic polymer (F) including an organic group represented by the general formula (3):

$$—Si(Me)_2(OH) \quad (3)$$

in the number of one or more on average per molecule to condensate with an organic silicon compound (G) represented by the general formula (4):

$$(R^4O)SiR^1{}_aR^2{}_bX_c \quad (4)$$

(wherein, $R^1$ that is present in the number of "a" each independently represents an organic group represented by the general formula (2) as specified in claim 1; $R^2$ that is present in the number of "b" each independently represents a hydrocarbon group having 1 to 20 carbon atoms, or a triorganosiloxy group represented by the formula of: $(R')_3SiO—$ (wherein, $R'$ each independently represents a hydrocarbon group having 1 to 20 carbon atoms); $R^4$ represents a hydrocarbon group having 1 to 20 carbon atoms; X that is present in the number of "c" each independently represents a hydrolyzable group or a hydroxyl group; a is 1 or 2; b is 0 or 1; c is 1 or 2; and the relationship of a+b+c=3 is satisfied); and wherein the hydrolysable group X is selected from the group consisting of a hydrogen atom, a halogen atom, an alkoxy group, an aryloxy group, an acyloxy group, a ketoximate group, an amino group, an amide group, an acid amide group, an aminooxy group, a mercapto group, and an alkenyloxy group, and the main chain skeleton of the organic polymer (F) has at least one selected from the group consisting of a polyoxyalkylene polymer, a saturated hydrocarbon polymer, and a (meth)acrylic ester polymer.

5. A method for producing the organic polymer (A) according to claim 3 which comprises allowing an organic polymer (F) comprising an organic group represented by the general formula (3):

$$—Si(Me)_2(OH) \quad (3)$$

in the number of one or more on average per molecule to condensate with an organic compound (G) represented by the general formula (4):

$$(R^4O)SiR^1{}_aR^2{}_bX_c \quad (4)$$

(wherein, $R^1$ that is present in the number of "a" each independently represents an organic group represented by the general formula (2) as specified in claim 1; $R^2$ that is present in the number of "b" each independently represents a hydrocarbon group having 1 to 20 carbon atoms, or a triorganosiloxy group represented by the formula of: $(R')_3SiO—$ (wherein, $R'$ each independently represents a hydrocarbon group having 1 to 20 carbon atoms); $R^4$ represents a hydrocarbon group having 1 to 20 carbon atoms; X that is present in the number of "c" each independently represents a hydrolyzable group or a hydroxyl group; a is 1 or 2; b is 0 or 1; c is 1 or 2; and the relationship of a+b+c=3 is satisfied); and wherein the hydrolysable group X is selected from the group consisting of a hydrogen atom, a halogen atom, an alkoxy group, an aryloxy group, an acyloxy group, a ketoximate group, an amino group, an amide group, an acid amide group, an aminooxy group, a mercapto group, and an alkenyloxy group, and the main chain skeleton of the organic polymer (F) is polypropylene oxide.

6. A curable composition which comprises the organic polymer (A) according to claim 2.

7. A curable composition which comprises the organic polymer (A) according to claim 3.

8. The curable composition according to claim 6 which further comprises a curing catalyst (B) in the composition.

9. The curable composition according to claim 7 which further comprises a curing catalyst (B) in the composition.

10. The curable composition according to claim 8 wherein the curing catalyst (B) comprises an amine compound.

11. The curable composition according to claim 9 wherein the curing catalyst (B) comprises an amine compound.

12. The curable composition according to claim 8 wherein the curing catalyst (B) comprises a carboxylic acid.

13. An organic polymer (A) having a number average molecular weight of 3,000 to 100,000, and comprising a crosslinkable silicon-containing organic group represented by the general formula (1):

$$—Si(Me)_2—O—SiR^1{}_aR^2{}_bX_c \quad (1)$$

(wherein, $R^1$ that is present in the number of "a" each independently represents an organic group represented by the general formula (2); $R^2$ that is present in the number of "b" each independently represents a hydrocarbon group having 1 to 20 carbon atoms, or a triorganosiloxy group represented by the formula of:

$$(R')_3SiO—$$

(wherein, $R'$ each independently represents a hydrocarbon group having 1 to 20 carbon atoms); X that is present in the number of "c" each independently represents a hydrolyzable group or a hydroxyl group; a is 1 or 2; b is 0 or 1; c is 1 or 2; and the relationship of: a+b+c=3 is satisfied) in the number of one or more on average per molecule $$—CR^3{}_{3-d}Y_d \quad (2)$$

(wherein, Y that is present in the number of "d" each independently represents an electron-withdrawing group; $R^3$ that is present in the number of (3-d) each independently represents a hydrogen atom or an alkyl group having 1 to 19 carbon atoms; and d is any one of 1, 2 or 3), wherein the main chain skeleton of the organic polymer (A) has a polyoxyalkylene polymer which is obtained by polymerization with a conjugated metal cyanide complex catalyst; and wherein the hydrolysable group as X is selected from the group consisting of a hydrogen atom, a halogen atom, an alkoxy group, an aryloxy group, an acyloxy group, a ketoximate group, an amino group, an amide group, an acid amide group, an aminooxy group, a mercapto group, and an alkenyloxy group.

14. The organic polymer according to claim 13 wherein the electron-withdrawing group included in the organic groups represented by the general formulae (2) is at least one selected from the group consisting of a halogen atom, an alkoxy group, a substituted or unsubstituted amino group, and a trifluoromethyl group.

15. The organic polymer according to claim 13, wherein the electron-withdrawing group is a chlorine atom.

16. The organic polymer according to claim 13 wherein the electron-withdrawing group is a dialkylamino group.

17. The organic polymer according to claim 13 wherein the main chain skeleton of the organic polymer (A) is polypropylene oxide.

18. A method for producing the organic polymer (A) according to claim 13 which comprises
allowing an organic polymer (F) including an organic group represented by the general formula (3):

$$—Si(Me)_2(OH) \quad (3)$$

in the number of one or more on average per molecule to condensate with an organic silicon compound (G) represented by the general formula (4):

$$(R^4O)SiR^1{}_aR^2{}_bX_c \quad (4)$$

(wherein, $R^1$ that is present in the number of "a" each independently represents an organic group represented by the general formula (2) as specified in claim 13; $R^2$ that is present in the number of "b" each independently represents a hydrocarbon group having 1 to 20 carbon atoms, or a triorganosiloxy group represented by the formula of: $(R')_3SiO—$ (wherein, R' each independently represents a hydrocarbon group having 1 to 20 carbon atoms); $R^4$ represents a hydrocarbon group having 1 to 20 carbon atoms; X that is present in the number of "c" each independently represents a hydrolyzable group or a hydroxyl group; a is 1 or 2; b is 0 or 1; c is 1 or 2; and the relationship of a+b+c=3 is satisfied); and
wherein the main chain skeleton of the organic polymer (F) has a polyoxyalkylene polymer which is obtained by polymerization with a conjugated metal cyanide complex catalyst; and
the hydrolysable group X is selected from the group consisting of a hydrogen atom, a halogen atom, an alkoxy group, an aryloxy group, an acyloxy group, a ketoximate group, an amino group, an amide group, an acid amide group, an aminooxy group, a mercapto group, and an alkenyloxy group.

19. A method for producing the organic polymer (A) according to claim 17 which comprises allowing an organic polymer (F) comprising an organic group represented by the general formula (3):

$$—Si(Me)_2(OH) \quad (3)$$

in the number of one or more on average per molecule to condensate with an organic compound (G) represented by the general formula (4):

$$(R^4O)SiR^1{}_aR^2{}_bX_c \quad (4)$$

(wherein, $R^1$ that is present in the number of "a" each independently represents an organic group represented by the general formula (2) as specified in claim 13; $R^2$ that is present in the number of "b" each independently represents a hydrocarbon group having 1 to 20 carbon atoms, or a triorganosiloxy group represented by the formula of: $(R')_3SiO—$ (wherein, R' each independently represents a hydrocarbon group having 1 to 20 carbon atoms); $R^4$ represents a hydrocarbon group having 1 to 20 carbon atoms; X that is present in the number of "c" each independently represents a hydrolyzable group or a hydroxyl group; a is 1 or 2; b is 0 or 1; c is 1 or 2; and the relationship of a+b+c=3 is satisfied); and
wherein the main chain skeleton of the organic polymer (F) is polypropylene oxide which is obtained by polymerization with a conjugated metal cyanide complex catalyst; and
the hydrolysable group X is selected from the group consisting of a hydrogen atom, a halogen atom, an alkoxy group, an aryloxy group, an acyloxy group, a ketoximate group, an amino group, an amide group, an acid amide group, an aminooxy group, a mercapto group, and an alkenyloxy group.

20. A curable composition which comprises the organic polymer (A) according to claim 13.

21. A curable composition which comprises the organic polymer (A) according to claim 17.

22. The curable composition according to claim 20 which further comprises a curing catalyst (B) in the composition.

23. The curable composition according to claim 21 which further comprises a curing catalyst (B) in the composition.

24. The curable composition according to claim 22 wherein the curing catalyst (B) comprises an amine compound.

25. The curable composition according to claim 23 wherein the curing catalyst (B) comprises an amine compound.

26. The curable composition according to claim 22 wherein the curing catalyst (B) comprises a carboxylic acid.

27. The organic polymer according to claim 13 wherein the electron-withdrawing group is at least one selected from a halogen atom, an alkoxy group, an acyloxy group, an amino group, a substituted amino group, an ureide group, an acyl group, an alkoxycarbonyl group, a nitro group, a cyano group, an isocyanato group, a sulfonyl group, a perfluoroalkyl group, a difluorophenyl group, and a pentafluorophenyl group.

28. A curable composition which comprises an organic polymer (A) having a number average molecular weight of 3,000 to 100,000, and comprising a crosslinkable silicon-containing organic group represented by the general formula (1):

$$—SiR^1{}_aR^2{}_bX_c \quad (1)$$

(wherein, $R^1$ that is present in the number of "a" each independently represents an organic group represented by the general formula (2); $R^2$ that is present in the number of "b" each independently represents a hydrocarbon group having 1 to 20 carbon atoms, or a triorganosiloxy group represented by the formula of:

$$(R')_3SiO—$$

(wherein, R' each independently represents a hydrocarbon group having 1 to 20 carbon atoms); X that is present in the number of "c" each independently represents a hydrolyzable group or a hydroxyl group; a is 1 or 2; b is 0 or 1; c is 1 or 2; and the relationship of: a+b+c=3 is satisfied) in the number of one or more on average per molecule $$—CR^3{}_{3-d}Y_d \quad (2)$$

(wherein, Y that is present in the number of "d" each independently represents an electron-withdrawing group; $R^3$ that is present in the number of (3-d) each independently represents a hydrogen atom or an alkyl group having 1 to 19 carbon atoms; and d is any one of 1, 2 or 3)

wherein the main chain skeleton of the organic polymer (A) has at least one selected from the group consisting of a polyoxyalkylene polymer, a saturated hydrocarbon polymer, and a (meth)acrylic ester polymer, and the organic polymer (A) is prepared by subjecting an organic polymer (D) including an unsaturated group represented by the general formula (8):

$$-CR^9=CR^9_2 \qquad (8)$$

(wherein, $R^9$ each independently represents a hydrogen atom or a substituted or unsubstituted hydrocarbon group having 1 to 20 carbon atoms) to a hydrosilylating reaction with hydrosilane compound (E) represented by the general formula (9):

$$H-SiR^1_aR^2_bX_c \qquad (9)$$

(wherein, $R^1$, $R^2$, X, a, b, and c are as defined above), and wherein the hydrolysable group as X is selected from the group consisting of a hydrogen atom, a halogen atom, an alkoxy group, an aryloxy group, an acyloxy group, a ketoximate group, an amino group, an amide group, an acid amide group, an aminooxy group, a mercapto group, and an alkenyloxy group, further comprising a curing catalyst (B) selected from the group consisting of an amine compound and/or a carboxylic acid.

29. The curable composition according to claim 28 wherein the electron-withdrawing group included in the organic groups represented by the general formulae (2) is at least one selected from the group consisting of a halogen atom, an alkoxy group, a substituted or unsubstituted amino group, and a trifluoromethyl group.

30. The curable composition according to claim 28, wherein the electron-withdrawing group is a chlorine atom.

31. The curable composition according to claim 28, wherein the electron-withdrawing group is a dialkylamino group.

32. The curable composition according to claim 28, wherein the main chain skeleton of the organic polymer (A) is polypropylene oxide.

33. The curable composition according to claim 28 wherein the electron-withdrawing group is at least one selected from a halogen atom, an alkoxy group, an acyloxy group, an amino group, a substituted amino group, an ureide group, a carbamate group, an acyl group, an alkoxycarbonyl group, a nitro group, a cyano group, an isocyanato group, a sulfonyl group, a perfluoroalkyl group, a difluorophenyl group, and pentafluorophenyl group.

34. The organic polymer according to claim 13 wherein, the electron-withdrawing group is an alkoxy group.

35. The organic polymer according to claim 13 wherein the electron-withdrawing group is a methoxy group.

36. The curable composition according to claim 28, wherein the general formula (1) is represented by $$-CHR^9-CR^9_2-SiR^1_aR^2_bX_c.$$

* * * * *